(12) United States Patent
Nielsen et al.

(10) Patent No.: US 8,566,737 B2
(45) Date of Patent: Oct. 22, 2013

(54) VIRTUAL WHITE LINES (VWL) APPLICATION FOR INDICATING AN AREA OF PLANNED EXCAVATION

(75) Inventors: Steven E. Nielsen, North Palm Beach, FL (US); Curtis Chambers, Palm Beach Gardens, FL (US); Jeffrey Farr, Jupiter, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 417 days.

(21) Appl. No.: 12/422,372

(22) Filed: Apr. 13, 2009

(65) Prior Publication Data

US 2010/0205554 A1  Aug. 12, 2010

Related U.S. Application Data

(60) Provisional application No. 61/151,815, filed on Feb. 11, 2009.

(51) Int. Cl.
G06F 3/048 (2013.01)

(52) U.S. Cl.
USPC .......................................... 715/771; 345/632

(58) Field of Classification Search
USPC ....................................................... 715/771
See application file for complete search history.

(56) References Cited

U.S. PATENT DOCUMENTS

| | | |
|---|---|---|
| 4,550,376 A | 10/1985 | Maciejczak |
| 5,032,989 A | 7/1991 | Tornetta |
| 5,414,462 A | 5/1995 | Veatch |
| 5,519,809 A | 5/1996 | Husseiny et al. |
| 5,557,515 A | 9/1996 | Abbruzzese et al. |
| 5,699,244 A | 12/1997 | Clark, Jr. et al. |
| 5,815,411 A | 9/1998 | Ellenby et al. |

(Continued)

FOREIGN PATENT DOCUMENTS

| | | |
|---|---|---|
| EP | 100324 B1 | 2/1984 |
| JP | 2005327228 | 11/2005 |
| JP | 2006189930 | 7/2006 |

OTHER PUBLICATIONS

"Case Study: Wireless mash-up keeps track of Vegas' pipes," TechWorld, http://howto.techworld.com/mobile-wireless/2297/case-study-wireless-mash-up-keeps tra..., printed Dec. 16, 2009 (original publication date unknown), 2 pages.

(Continued)

*Primary Examiner* — Nicholas Augustine
*Assistant Examiner* — Andres E Gutierrez

(57) ABSTRACT

Methods and apparatus for facilitating detection of a presence or an absence of at least one underground facility within a dig area. Source data representing one or more input images of a geographic area including the dig area is electronically received at a first user location, which may be remote from the dig area. The source data is processed so as to display at least a portion of the input image(s) on a display device at the first user location. One or more indicators are added to the displayed input image(s), via a user input device associated with the display device, to provide at least one indication of the dig area and thereby generate a marked-up digital image. In one example, the indicator(s) is/are markings that indicate a point, line, and/or path. The indicator(s) may provide a reference for a locate operation or an area of planned excavation. A description, such as of the area of planned excavation, may be provided with reference to the indicator(s).

22 Claims, 12 Drawing Sheets

(56) References Cited

U.S. PATENT DOCUMENTS

| | | | |
|---|---|---|---|
| 5,937,406 A | 8/1999 | Balabine et al. | |
| 5,961,569 A | 10/1999 | Craport et al. | |
| 5,987,380 A | 11/1999 | Backman et al. | |
| 6,075,481 A | 6/2000 | Eslambolchi et al. | |
| 6,101,087 A | 8/2000 | Sutton et al. | |
| 6,169,517 B1 | 1/2001 | Eslambolchi et al. | |
| 6,195,922 B1 | 3/2001 | Stump | |
| 6,298,446 B1 | 10/2001 | Schreiber et al. | |
| 6,343,290 B1 | 1/2002 | Cossins et al. | |
| 6,401,051 B1* | 6/2002 | Merriam | 702/150 |
| 6,421,725 B1 | 7/2002 | Vermilyea et al. | |
| 6,426,872 B1 | 7/2002 | Sutton et al. | |
| 6,434,258 B2 | 8/2002 | Wiens | |
| 6,445,334 B1 | 9/2002 | Bradley | |
| 6,493,650 B1 | 12/2002 | Rodgers et al. | |
| 6,501,501 B1 | 12/2002 | Miyazawa | |
| 6,587,851 B1 | 7/2003 | Ditcharo et al. | |
| 6,650,293 B1 | 11/2003 | Eslambolchi et al. | |
| 6,710,741 B2 | 3/2004 | Tucker | |
| 6,751,552 B1 | 6/2004 | Minelli | |
| 6,751,553 B2 | 6/2004 | Young et al. | |
| 6,751,554 B1 | 6/2004 | Asher et al. | |
| 6,772,142 B1 | 8/2004 | Kelling et al. | |
| 6,798,379 B2 | 9/2004 | Tucker et al. | |
| 6,853,905 B2 | 2/2005 | Barton | |
| 6,895,356 B2 | 5/2005 | Brimhall et al. | |
| 6,898,525 B1 | 5/2005 | Minelli | |
| 6,904,361 B1 | 6/2005 | Tallman et al. | |
| 6,956,524 B2 | 10/2005 | Tucker et al. | |
| 6,958,690 B1 | 10/2005 | Asher et al. | |
| 6,972,698 B2 | 12/2005 | Deguchi | |
| 6,999,021 B2 | 2/2006 | Taylor, Jr. et al. | |
| 7,003,138 B2 | 2/2006 | Wilson | |
| 7,054,741 B2 | 5/2006 | Harrison et al. | |
| 7,133,802 B2 | 11/2006 | Koch et al. | |
| 7,142,196 B1 | 11/2006 | Connor et al. | |
| 7,171,389 B2 | 1/2007 | Harrison | |
| 7,216,034 B2 | 5/2007 | Vitikainen et al. | |
| 7,262,797 B2 | 8/2007 | Weldum | |
| 7,313,759 B2 | 12/2007 | Sinisi | |
| 7,356,406 B2 | 4/2008 | Harrison et al. | |
| 7,447,509 B2 | 11/2008 | Cossins et al. | |
| 7,482,973 B2 | 1/2009 | Tucker et al. | |
| 7,640,105 B2 | 12/2009 | Nielsen et al. | |
| 7,773,095 B1 | 8/2010 | Badrak et al. | |
| 7,978,129 B2 | 7/2011 | Sawyer et al. | |
| 8,045,995 B2 | 10/2011 | King | |
| 8,311,765 B2 | 11/2012 | Nielsen et al. | |
| 8,463,487 B2 | 6/2013 | Nielsen et al. | |
| 8,467,932 B2 | 6/2013 | Nielsen et al. | |
| 2001/0004739 A1 | 6/2001 | Sekiguchi et al. | |
| 2002/0078035 A1 | 6/2002 | Frank et al. | |
| 2002/0124177 A1 | 9/2002 | Harper | |
| 2002/0184235 A1 | 12/2002 | Young et al. | |
| 2003/0012411 A1* | 1/2003 | Sjostrom et al. | 382/109 |
| 2003/0061211 A1 | 3/2003 | Shultz et al. | |
| 2003/0110184 A1 | 6/2003 | Gibson et al. | |
| 2003/0131251 A1 | 7/2003 | Fetkovich | |
| 2004/0006425 A1 | 1/2004 | Wood et al. | |
| 2004/0030706 A1 | 2/2004 | Evans | |
| 2004/0110515 A1 | 6/2004 | Blumberg et al. | |
| 2004/0128215 A1 | 7/2004 | Florance | |
| 2004/0210370 A1 | 10/2004 | Gudat et al. | |
| 2005/0033513 A1 | 2/2005 | Gasbarro | |
| 2005/0038999 A1 | 2/2005 | Pelly | |
| 2005/0262109 A1 | 11/2005 | Alexandrescu | |
| 2005/0273346 A1 | 12/2005 | Frost | |
| 2006/0026020 A1* | 2/2006 | Waite et al. | 705/1 |
| 2006/0077095 A1 | 4/2006 | Tucker et al. | |
| 2006/0085133 A1 | 4/2006 | Young et al. | |
| 2006/0085396 A1 | 4/2006 | Evans et al. | |
| 2006/0125828 A1 | 6/2006 | Harrison | |
| 2006/0161349 A1 | 7/2006 | Cross et al. | |
| 2006/0200305 A1 | 9/2006 | Sheha et al. | |
| 2006/0208927 A1 | 9/2006 | Poor et al. | |
| 2006/0282280 A1* | 12/2006 | Stotz et al. | 705/1 |
| 2006/0285152 A1* | 12/2006 | Skillen | 358/1.15 |
| 2007/0112936 A1 | 5/2007 | Harrison | |
| 2007/0143676 A1 | 6/2007 | Chen | |
| 2007/0195011 A1 | 8/2007 | Hatori et al. | |
| 2007/0219722 A1* | 9/2007 | Sawyer et al. | 702/1 |
| 2007/0226004 A1 | 9/2007 | Harrison | |
| 2008/0021863 A1* | 1/2008 | Evans et al. | 707/1 |
| 2008/0189249 A1 | 8/2008 | Petakov et al. | |
| 2008/0228294 A1* | 9/2008 | Nielsen et al. | 700/58 |
| 2008/0245299 A1 | 10/2008 | Nielsen et al. | |
| 2009/0013928 A1 | 1/2009 | Nielsen et al. | |
| 2009/0174768 A1 | 7/2009 | Blackburn et al. | |
| 2009/0201178 A1 | 8/2009 | Nielsen et al. | |
| 2009/0201311 A1 | 8/2009 | Nielsen et al. | |
| 2009/0202101 A1 | 8/2009 | Nielsen et al. | |
| 2009/0202110 A1 | 8/2009 | Nielsen et al. | |
| 2009/0202111 A1 | 8/2009 | Nielsen et al. | |
| 2009/0202112 A1 | 8/2009 | Nielsen et al. | |
| 2009/0204238 A1 | 8/2009 | Nielsen et al. | |
| 2009/0204466 A1 | 8/2009 | Nielsen et al. | |
| 2009/0204614 A1 | 8/2009 | Nielsen et al. | |
| 2009/0204625 A1 | 8/2009 | Nielsen et al. | |
| 2009/0207019 A1 | 8/2009 | Nielsen et al. | |
| 2009/0208642 A1 | 8/2009 | Nielsen et al. | |
| 2009/0210098 A1 | 8/2009 | Nielsen et al. | |
| 2009/0210284 A1 | 8/2009 | Nielsen et al. | |
| 2009/0210285 A1 | 8/2009 | Nielsen et al. | |
| 2009/0210297 A1 | 8/2009 | Nielsen et al. | |
| 2009/0210298 A1 | 8/2009 | Nielsen et al. | |
| 2009/0237408 A1 | 9/2009 | Nielsen et al. | |
| 2009/0238414 A1 | 9/2009 | Nielsen et al. | |
| 2009/0238415 A1 | 9/2009 | Nielsen et al. | |
| 2009/0238416 A1 | 9/2009 | Nielsen et al. | |
| 2009/0238417 A1 | 9/2009 | Nielsen et al. | |
| 2009/0241045 A1 | 9/2009 | Nielsen et al. | |
| 2009/0241046 A1 | 9/2009 | Nielsen et al. | |
| 2009/0324815 A1 | 12/2009 | Nielsen et al. | |
| 2009/0327024 A1 | 12/2009 | Nielsen et al. | |
| 2010/0006667 A1 | 1/2010 | Nielsen et al. | |
| 2010/0010862 A1 | 1/2010 | Nielsen et al. | |
| 2010/0010863 A1 | 1/2010 | Nielsen et al. | |
| 2010/0010882 A1 | 1/2010 | Nielsen et al. | |
| 2010/0010883 A1 | 1/2010 | Nielsen et al. | |
| 2010/0033684 A1 | 2/2010 | Thiebaud | |
| 2010/0084532 A1 | 4/2010 | Nielsen et al. | |
| 2010/0085054 A1 | 4/2010 | Nielsen et al. | |
| 2010/0085185 A1 | 4/2010 | Nielsen et al. | |
| 2010/0085376 A1 | 4/2010 | Nielsen et al. | |
| 2010/0085694 A1 | 4/2010 | Nielsen et al. | |
| 2010/0085701 A1 | 4/2010 | Nielsen et al. | |
| 2010/0086671 A1 | 4/2010 | Nielsen et al. | |
| 2010/0086677 A1 | 4/2010 | Nielsen et al. | |
| 2010/0088031 A1 | 4/2010 | Nielsen et al. | |
| 2010/0088032 A1 | 4/2010 | Nielsen et al. | |
| 2010/0088134 A1 | 4/2010 | Nielsen et al. | |
| 2010/0088135 A1 | 4/2010 | Nielsen et al. | |
| 2010/0088164 A1 | 4/2010 | Nielsen et al. | |
| 2010/0090700 A1 | 4/2010 | Nielsen et al. | |
| 2010/0090858 A1 | 4/2010 | Nielsen et al. | |
| 2010/0091200 A1 | 4/2010 | Vigouroux | |
| 2010/0094553 A1 | 4/2010 | Nielsen et al. | |
| 2010/0117654 A1 | 5/2010 | Nielsen et al. | |
| 2010/0188088 A1 | 7/2010 | Nielsen et al. | |
| 2010/0188215 A1 | 7/2010 | Nielsen et al. | |
| 2010/0188216 A1 | 7/2010 | Nielsen et al. | |
| 2010/0188245 A1 | 7/2010 | Nielsen et al. | |
| 2010/0188407 A1 | 7/2010 | Nielsen et al. | |
| 2010/0189312 A1 | 7/2010 | Nielsen et al. | |
| 2010/0189887 A1 | 7/2010 | Nielsen et al. | |
| 2010/0198663 A1 | 8/2010 | Nielsen et al. | |
| 2010/0201690 A1 | 8/2010 | Nielsen et al. | |
| 2010/0201706 A1 | 8/2010 | Nielsen et al. | |
| 2010/0205031 A1 | 8/2010 | Nielsen et al. | |
| 2010/0205032 A1 | 8/2010 | Nielsen et al. | |
| 2010/0205195 A1 | 8/2010 | Nielsen et al. | |
| 2010/0205264 A1 | 8/2010 | Nielsen et al. | |
| 2010/0205536 A1 | 8/2010 | Nielsen et al. | |
| 2010/0205555 A1 | 8/2010 | Nielsen et al. | |

(56) References Cited

U.S. PATENT DOCUMENTS

| | | |
|---|---|---|
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256863 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0268786 A1 | 10/2010 | Nielsen et al. |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0135163 A1 | 6/2011 | Nielsen et al. |
| 2011/0137769 A1 | 6/2011 | Nielsen et al. |
| 2011/0236588 A1 | 9/2011 | Nielsen et al. |
| 2011/0249394 A1 | 10/2011 | Nielsen et al. |
| 2012/0058751 A1* | 3/2012 | Colley ................ 455/414.2 |
| 2012/0110019 A1 | 5/2012 | Nielsen et al. |
| 2012/0113244 A1 | 5/2012 | Nielsen et al. |
| 2012/0274476 A1 | 11/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0085670 A1 | 4/2013 | Nielsen et al. |
| 2013/0101180 A1 | 4/2013 | Nielsen et al. |
| 2013/0103318 A1 | 4/2013 | Nielsen et al. |
| 2013/0116855 A1 | 5/2013 | Nielsen et al. |
| 2013/0125042 A1 | 5/2013 | Nielsen et al. |
| 2013/0135343 A1 | 5/2013 | Nielsen et al. |

OTHER PUBLICATIONS

Gopher State One Call—History and Background, http://www.gopherstateonecall.org/history.aspx, printed on Dec. 12, 2009 (original publication date unknown), 2 pages.

Gopher State One Call—Virtual Polygon Fact Sheet, http://www.gopherstateonecall.org/docs/Virtual%20Polygon%20Fact%20Sheet.pdf, printed on Dec. 16, 2009 (original publication date unknown), 4 pages.

Hanneman, J., "Notification and the NMOC Map System," http://nmonecall.org/articles.htm, printed on Dec. 16, 2009 (original publication date unknown), 10 pages.

International Search Report and Written Opinion, Application Serial No. PCT/US2009/01707, May 14, 2009, 13 pages.

One Call Concepts Inc.—Company News & Executive Profiles, BNET Industries, http://resources.bnet.com/topic/one_call+concepts+inc..html, printed on Dec. 15, 2009 (original publication date unknown), 6 pages.

One Call Concepts Inc.—Prism Software, http://www.occinc.com/services/prism_software.asp, printed on Dec. 16, 2009 (original publication date unknown), 1 page.

Pevarski, R., Virginia Pilot Project: Technology Meets Damage Prevention, http://www.excavationsafetyonline.com/esg/guidePDFs/2009_2009_ESG_Page_9.pdf, printed on Nov. 3, 2009, 1 page.

Pickus, J., "Call USA—Automating "Call Before You Dig" Processes for a Major Utility," GITA's Annual Conference on Apr. 25-28, 2004, 19 pages.

Pickus, J., "Internet GIS for the Municipality," Las Vegas Water District, http://spatialnews.geocomm.com/geonetcom/seminar3.html, printed Dec. 16, 2009 (original publication date unknown), 3 pages.

Schutzberg, A., "Autodesk Positions Itself for 2008 and Beyond," Location Intelligence Articles, Feb. 22, 2008, http://www.locationintelligence.net/articles/2693.html, printed Dec. 16, 2009, 4 pages.

Stocking, A., "Betting on Technology," Mar. 2007, http://www.resources.autodesk.com/files/government/customer_stories/A137-LVTBVWD_Municipal_Sewer_and_Water_article.pdf, 3 pages.

Utility Notification Center—Membership Details, http://www.callbeforeyoudig.org/himember.htm, printed on Dec. 12, 2009 (original publication date unknown), 12 pages.

Blue Stakes of Utah Utility Notification Center, Inc., Association Newsletter, vol. 1, No. 1, 8 pages, Nov. 1, 2005.

Blue Stakes of Utah Utility Notification Center, Inc., Association Newsletter, vol. 1, No. 2, 5 pages, Jul. 15, 2006.

Blue Stakes of Utah Utility Notification Center, Inc., Association Newsletter, vol. 3, No. 1, 7 pages, Nov. 2007.

Blue Stakes of Utah Utility Notification Center, Inc., Association Newsletter, vol. 5, No. 1, 7 pages, Dec. 2009.

DigSafely New York, i-Notice, http://www.ufpo.org/excv/Inotice/, (original publication date unknown), printed Jun. 5, 2010, 4 pages.

Eastern Virginia Damage Prevention Committee, Meeting Minutes, Mar. 26, 2009 and May 12, 2009, 6 pages.

Fredericksburg Area Damage Prevention Committee, Meeting Minutes, Dec. 2009.

Georgia UPC EDEN, Web Entry Instruction Manual, www.gaupc.org, Jan. 22, 2009, 60 pages.

GPS Technology Enhancing Underground Utility Locating, Underground Construction Magazine, Apr. 2010, 3 pages.

Illinois One-Call System, NEWTIN Remote Ticket Entry User's Manual, Jun. 12, 2007, 29 pages.

IRTH Internet Manual, Arizona Bluestake, Call Before you Dig, http://www.azbluestake.com/main/download/IRTHNetFeatures.pdf, (original publication date unknown), 47 pages.

IRTH Internet Manual, Georgia Utilities Protection Center, Feb. 16, 2006, 20 pages.

IRTH One Call Centers, Underground Utility Damage Prevention, Ticket Management, http://www.irth.com/SOLUTIONS/IRTH_ONE_CALL/index.aspx, (original publication date unknown), 2 pages.

Letter from Norfield Data Products to Wolf Greenfield & Sacks, P.C., May 5, 2010, 2 pages.

North Carolina One-Call Center, Newtin Remote Ticket Entry Application Tutorial, Sep. 17, 2009, 24 pages.

North Carolina One-Call Center, Newtin Remote Ticket Entry Quick Map Tutorial, Nov. 2008, 13 pages.

NTDPC One-Call Mapping Notification Processes, http://www.ntdpc.com/ntdpc/faces/ntscf.jsp, (original publication date unknown), 12 pages.

Utility Notification Center of Colorado, Annual Report for Fiscal Year 2004, 41 pages.

(56) References Cited

OTHER PUBLICATIONS

Utility Notification Center of Colorado, Annual Report for Fiscal Year 2005, 39 pages.
Utility Notification Center of Colorado, Annual Report for Fiscal Year 2006, 49 pages.
Utility Notification Center of Colorado, Annual Report for Fiscal Year 2007, 44 pages.
Utility Notification Center of Colorado, Annual Report for Fiscal Year 2008, 39 pages.
Virginia Pilot Project for One-call Location Technology, Project Plan, Aug. 2006, 28 pages.
Common Ground Alliance, Best Practices Version 1.0, Apr. 2003.
Common Ground, Study of One-Call Systems and Damage Prevention Best Practices, Aug. 1999.
International Search Report and Written Opinion, U.S. Appl. No. PCT/2010/000131, Apr. 23, 2010.
Virginia Pilot Project, Incorporating GPS Technology to Enhance One-Call Damage Prevention, Phase I—Electronic White Lining Project Report, Nov. 2007, 50 pages.
Blue Stakes of Utah Utility Notification Center, Inc., Association Newsletter, vol. 4, No. 1, pp. 1-8, Nov. 2008.
http://www.a11call.com/rte_proc.html, printed Apr. 14, 2009, 1 page (original publication date unknown).
Alabama 1 Call, GeoRemote, Remote Ticket Entry Manual, 35 pages, printed from website http://www,a11call.com on Apr. 2, 2009 (original publication date unknown).
Alabama 1 Call, Annual Operations Report, 2005, 32 pages, printed from website http://www.a11call.com on Apr. 2, 2009 (original publication date unknown).
Co-Pending U.S. Appl. No. 12/050,555, filed Mar. 18, 2008.
Co-Pending U.S. Appl. No. 12/239,366, filed Sep. 26, 2008.
Co-Pending U.S. Appl. No, 12/239,414, filed Sep. 26, 2008.
Co-Pending U.S. Appl. No. 12/355,222, filed Jan. 16, 2009.
Co-Pending U.S. Appl. No. 12/355,272, filed Jan. 16, 2009.
Co-Pending U.S. Appl. No. 12/355,300, filed Jan. 16, 2009.
Co-Pending U.S. Appl. No. 12/366,853, filed Feb. 6, 2009.
Co-Pending U.S. Appl. No. 12/475,924, filed Jun. 1, 2009.
Co-Pending U.S. Appl. No. 12/475,935, filed Jun. 1, 2009.
Co-Pending U.S. Appl. No. 12/475,956, filed Jun. 1 2009.
Co-Pending U.S. Appl. No. 12/475,905, filed Jun. 1, 2009.
Co-Pending U.S. Appl. No. 12/422,364, filed Apr. 13, 2009.
Binder 1: "Virginia Utility Protection Service, Inc. Response to US Application Publication . . . ," pp. DY0001-DY0755, Nov. 3, 2010.
Binder 2: "Patent US 2009 0237408," pp. DY0756-DY1271, Nov. 3, 2010.
Binder 3: "Patent US 2009 0238414," pp. DY1272-DY2210, Nov. 3, 2010.
Binder 4: "Patent US 2009 0238415," pp. DY2211-DY3308, Nov. 3, 2010.
Binder 5: "Patent US 2009 0238416," pp. DY3309-DY3889, Nov. 3, 2010.
Binder 6: "Patent US 2009 0238417," pp. DY3890-DY4133, Nov. 3, 2010.
Binder 7: "Patent US 2009 0241045," pp. DY4134-DY4276, Nov. 3, 2010.
Binder 8: "Patent US 2009 0241046," pp. DY4277-DY4499, Nov. 3, 2010.
R. Pevarski, Letter from the Virginia Utility Protection Service, Inc., dated Apr. 7, 2010.
H.L. Smith, Letter dated Oct. 27, 2010.
H.L Smith, Letter dated Jan. 14, 2011, with two attachments each dated Jan. 5, 2011.
Bernhardsen, T., "Georgraphic Information Systems," 2007, http://onlinelibrary.wiley.com.
Notice of Allowance dated Apr. 11, 2012 from U.S. Appl. No. 12/355,222.
Notice of Allowance dated May 8, 2012 from U.S. Appl. No. 12/366,853.
Office Action dated Feb. 14, 2012 from U.S. Appl. No. 12/833,103.
Office Action dated Mar. 1, 2012 from U.S. Appl. No. 12/475,924.
Office Action dated Mar. 12, 2012 from U.S. Appl. No. 12/355,272.
Office Action dated Mar. 26, 2012 from U.S. Appl. No. 12/422,364.
Office Action dated Mar. 28, 2012 from U.S. Appl. No. 12/475,956.
Office Action dated Apr. 16, 2012 from U.S. Appl. No. 12/475,935.
Office Action dated May 3, 2012 from U.S. Appl. No. 12/050,555.
Office Action dated May 4, 2012 from U.S. Appl. No. 12/239,414.
Rigaux, P., "Spatial Databases," 2002, http://books.google.com.
Webopedia—What is a Database, http://www.webopedia.com/TERM/D/database.html, original publication date unknown, retrieved Apr. 24, 2012.
Corrected Notice of Allowability dated Oct. 12, 2012 from U.S. Appl. No. 12/355,300.
Corrected Notice of Allowability dated Nov. 26, 2012 from U.S. Appl. No. 12/475,924.
Notice of Allowability dated Sep. 27, 2012 from U.S. Appl. No. 12/355,272.
Notice of Allowability dated Dec. 10, 2012 from U.S. Appl. No. 12/355,300.
Notice of Allowance dated Mar. 20, 2013 from Canadian Application No. 2,749,917.
Notice of Allowance dated Jul. 11, 2012 from U.S. Appl. No. 12/355,300.
Notice of Allowance dated Aug. 21, 2012 from U.S. Appl. No. 12/355,272.
Notice of Allowance dated Aug. 23, 2012 from U.S. Appl. No. 12/239,366.
Notice of Allowance dated Oct. 22, 2012 from U.S. Appl. No. 12/475,924.
Notice of Allowance dated Nov. 8, 2012 from U.S. Appl. No. 12/475,905.
Office Action dated Feb. 12, 2013 from U.S. Appl. No. 12/833,103.
Office Action dated Jul. 18, 2012 from U.S. Appl. No. 12/239,414.
Office Action dated Aug. 2, 2012 from Canadian Application No. 2,718,877.
Office Action dated Nov. 14, 2012 from U.S. Appl. No. 13/543,359.
Office Action dated Dec. 21, 2012 from U.S. Appl. No. 12/475,956.
Office Action dated Dec. 27, 2012 from Canadian Application No. 2,718,877.
Office Action dated Dec. 31, 2012 from U.S. Appl. No. 12/239,414.
Office Action dated Mar. 8, 2013 from Canadian Application No. 2,750,923.
Patent Examination Report No. 1, Australian Application No. 2010214085, Mar. 26, 2013.
Patent Examination Report No. 1, Australian Application No. 2010214086 , Feb. 28, 2013.
Patent Examination Report No. 1, Australian Application No. 2012211427, Feb. 15, 2013.
U.S. Appl. No. 13/192,138, filed Jul. 6, 2012, Nielsen et al.
U.S. Appl. No. 13/528,164, filed Jun. 20, 2012, Nielsen et al.
Notice of Allowance dated Jun. 28, 2012 from U.S. Appl. No. 12/050,555.
Office Action dated Jun. 21, 2012 from U.S. Appl. No. 12/355,272.
Corrected Notice of Allowability dated Jun. 8, 2012 from U.S. Appl. No. 12/366,853.
Notice of Allowability dated Jun. 8, 2012 from U.S. Appl. No. 12/355,222.
Office Action dated May 15, 2012 from U.S. Appl. No. 12/239,366.
Office Action dated May 24, 2012 from U.S. Appl. No. 12/355,300.
Office Action dated Jun. 8, 2012 from U.S. Appl. No. 12/475,905.
U.S. Appl. No. 13/028,687, filed Feb. 16, 2011, Nielsen et al.
U.S. Appl. No. 12/833,103, filed Jul. 9, 2010, Nielsen et al.
Australian Dial BeforeYou Dig User Kit, http://1100.com.au/Portals/0/pdf/DBYD_user_kit_2010.pdf, original publication date unknown, retrieved Sep. 7, 2011, 24 pages.
CGA, Common Ground Alliance, Best Practices, Version 4.0, Mar. 2007, 102 pages.
CHMURA, A., "Professional Excavators Enter Tickets Easily through i-dig," Ohio Call Center, summer 2011, 3 pages.
England & Wales beforeUdig Users Manual v 1.0.0, www.beforeudig.com.uk, original publication date unknown, retrieved Sep. 7, 2011, 22 pages.

(56) References Cited

OTHER PUBLICATIONS

IOWA One Call, Design Request System Tutorial, https://docs.google.com/viewer?a=v&pid=explorer&chrome=true&srcid=0Bzfisq-1kKARMzJjYTBjZDEtNTJiYy00YTJmLThjZjMtY2FkZjlzZWNhNDZi&hi=en&authkey=Clq6zKAN, original publication date unknown, retrieved Nov. 16, 2011, 32 pages.

IRTHNet GIS, http://www.irth.com/index.php?option=com_content&view=article&id=90&Itemid=73, 2010, printed Jul. 30, 2010, 1 page.

ITIC, A guide to using the ITIC system, New Jersey One Call Concepts, inc., http://www.nj1-call.org/docs/NJ%20ITIC%20Manual.pdf, original publication date unknown, retrieved Nov. 16, 2011, 33 pages.

Kansas One Call Excavator Newsletter, fall 2006, 4 pages. http://www.kansasonecall.com/excavators/newsletter/.

Kansas One Call Excavator Newsletter, winter 2005, 4 pages, http://www.kansasonecall.com/excavators/newsletter/.

New Zealand beforeUdig Users Manual. http://www.beforeudig.co.nz/images/stories/beforeudig%20online%20system%20update%20v.1.1.pdf original publication date unknown, retrieved Sep. 7, 2011, 3 pages.

Notice of Allowance dated Nov. 15, 2011 from U.S. Appl. No. 13/028,687.

Office Action dated Aug. 5, 2011 from U.S. Appl. No. 12/475,935.
Office Action dated Sep. 29, 2011 from U.S. Appl. No. 12/355,222.
Office Action dated Sep. 29, 2011 from U.S. Appl. No. 12/366,853.
Office Action dated Oct. 3, 2011 from Canadian Application No. 2,718,877.
Office Action dated Oct. 18, 2011 from U.S. Appl. No. 12/355,272.
Office Action dated Nov. 7, 2011 from U.S. Appl. No. 12/422,364.
Office Action dated Nov. 8, 2011 from U.S. Appl. No. 12/050,555.
Office Action dated Nov. 8, 2011 from U.S. Appl. No. 12/239,366.
Office Action dated Nov. 9, 2011 from U.S. Appl. No. 12/239,414.
Office Action dated Nov. 10, 2011 from U.S. Appl. No. 12/355,300.
Office Action dated Sep. 14, 2011 from U.S. Appl. No. 12/475,924.

One Call Concepts Locating Services, inc., Point Positive Utility Mapping & GIS, http://www.occls.com/Default.aspx?content=pointpositive, original publication date unknown, retrieved Sep. 21, 2011, 1 page.

PELICAN Corp., beforeUdig mobile, http://www.pelicancorp.com/index.php?option=com_content&view=article&id=145&Itemid=133, original publication date unknown, printed Aug. 30, 2011, 1 page.

PELICAN Corp., DigSAFE One Call Key Capabilities, http://www.pelicancorp.com/index.php?option=com_content&view=article&id=104&Itemid=121, original publication date unknown, printed Aug. 30, 2011, 2 pages.

PELICAN Corp., DigSAFE Pro Automated Plan Response Server, http://www.pelicancorp.com/index.php?option=com_content&view=article&id=48&Itemid=68, original publication date unknown, printed Aug. 30, 2011, 2 pages.

PELICAN Corp., DigSAFE Pro Automation Workflow, http://www.pelicancorp.com/index.php?option=com_content&view=article&id=119&Itemid=124, original publication date unknown, printed Aug. 30, 2011, 2 pages.

PELICAN Corp., DigSAFE Pro New and Updated features for version 2.4, http://www.pelicancorp.com/index.php?option=com_content&view=articie&id=151&Itemid=91, original publication date unknown, printed Aug. 30, 2011, 2 pages.

PELICAN Corp., How beforeUdig works, http://www.pelicancorp.com/index.php?option=com_content&view=article&id=114&Itemid=105, original publication date unknown, printed Aug. 30, 2011, 1 page.

PELICAN Corp., Using beforeUdig, http://www.pelicancorp.com/index.php?option=com_content&view=article&id=115&Itemid=106, original publication date unknown, printed Aug. 30, 2011, 1 page.

Schall, G. et al., "Virtual Redlining for Civil Engineering in Real Environments," IEEE International Symposium on Mixed and Augmented Reality Sep. 15-18, 2008. Cambridge, UK, 4 pages.

Singapore beforeudig Frequently Asked Questions, http://www.beforeudig.com.sg/index.php?option=com_content&view=article&id=9&Itemid=10, original publication date unknown, retrieved Nov. 28, 2011, 2 pages.

USA North, "Damage Prevention Update," Jun. 2011 Newsletter, http://www.usanorth.org/2011JuneFinal.pdf, 4 pages.

Office Action dated Jun. 13, 2013 from U.S. Appl. No. 13/543,359.
Office Action dated Jun. 19, 2013 from U.S. Appl. No. 12/833,103.
Office Action dated Jun. 28, 2013 from U.S. Appl. No. 13/528,164.
Office Action dated Jul. 3, 2013 from U.S. Appl. No. 12/475,956.

* cited by examiner

VIRTUAL WHITE LINES (VWL) APPLICATION FOR INDICATING AN AREA OF PLANNED EXCAVATION

CROSS-REFERENCE TO RELATED APPLICATION(S)

This application claims the benefit, under 35 U.S.C. §119(e), of U.S. Provisional Application Ser. No. 61/151,815, entitled "VIRTUAL WHITE LINES (VWL) APPLICATION FOR INDICATING A POINT, LINE, AND/OR PATH OF PLANNED EXCAVATION," filed on Feb. 11, 2009, which is hereby incorporated herein by reference in its entirety.

BACKGROUND

In the construction industry, the process of locating and marking underground facilities is required prior to any excavation activity. In this process, excavators are required to notify underground facility owners in advance of their excavation activities and to describe and communicate the geographic area of those activities to the underground facility owners. For example, excavators may submit a work order (i.e., locate request or ticket) to, for example, a one-call center, which serves as notification to underground facility owners of the planned excavation. A locate request (or ticket) may be any communication or instruction to perform a locate operation at a certain dig area. The dig area is any specified geographic area within which excavation may occur. One call centers may receive locate requests from excavators via electronic delivery or verbally through a telephone conversation between the excavator and a human call center operator. Whether communicated electronically or verbally, excavators must describe the planned geographic locations of dig areas. This description may be ultimately reduced to text, which, along with other data about a locate request, is communicated to the appropriate locate service provider.

Textual descriptions of dig areas can be very imprecise as to exact physical locations. In addition, addresses which are provided may be unclear, indicating only cross streets and vague descriptions of the extent of the dig area. Therefore, when a locate request is submitted by an excavator, it may be beneficial for the excavator to supplement the locate request with a visit to the site of the dig area for the purpose of indicating the particular geographic location of the proposed excavation. For example, marks may be used to physically indicate a dig area. These marks may consist of chalk or paint that is applied to the surface of the ground, and are generally known as "white lines." The marked dig area indicates to a locate technician the extent of the boundaries where a locate operation is to be performed according to the locate request that was submitted by the excavator.

However, the use of these physical white lines to physically indicate the dig area may be limited. For example, these physical white lines provide only a temporary indication of the dig area, as the physical white lines may deteriorate or be eliminated over time by such events as precipitation, excessive pedestrian or vehicle traffic, erosion, the excavation process, or numerous other events. Therefore, a need exists for improved ways of indicating the proposed excavation site in a more permanent and/or reproducible manner.

Further, while marking the dig area with white lines may serve to identify a certain dig area, it may lack specificity with respect to the precise location of the planned excavation. Currently, a locate technician arrives at the job site and may perform tasks associated with locate operations over the entire dig area that has been marked via the white lines, when in fact the precise location of interest to the excavator may only be a path or line within or across the marked dig area. Consequently, time and resources may be lost performing tasks associated with locate operations over a larger physical area than is necessary. Therefore, a need exists for improved ways of indicating with more specificity the dig area of planned excavation.

SUMMARY

Various embodiments of the present invention are directed to methods, apparatus and systems for creating an electronic record relating to a geographic area including a dig area to be excavated or otherwise disturbed. As part of the electronic record, the dig area is somehow identified with respect to its immediate surroundings in the geographic area. For example, to create such an electronic record, one or more input images relating to the geographic area including the dig area may be utilized. For example, source data representing one or more input images of a geographic area including the dig area is received and/or processed so that the input image(s) may be displayed on a display device. The dig area is then indicated in some manner on the displayed input image(s) so as to generate one or more marked-up images constituting at least a portion of the electronic record.

In some implementations of the inventive concepts disclosed herein, the electronic record may include a variety of non-image information to facilitate identification of the dig area (e.g., a text description of the dig area, an address or lot number of a property within which the dig area is located, geo-encoded information such as geographic coordinates relating to the dig area and/or various aspects of the geographic area surrounding the dig area, etc.). The marked-up image(s) and the non-image information may be formatted in a variety of manners in the electronic record; for example, in one implementation the non-image information may be included as metadata associated with the marked-up image(s), while in other implementations the marked-up image(s) and the non-image information may be formatted as separate data sets. These separate data sets may be transmitted and/or stored separately, but may nonetheless be linked together in some manner as relating to a common electronic record.

One embodiment described herein comprises a method for facilitating detection of a presence or an absence of at least one underground facility within a dig area, wherein at least a portion of the dig area may be excavated or disturbed during excavation activities. The method comprises: A) electronically receiving source data representing at least one input image of a geographic area including the dig area; B) processing the source data so as to display at least a portion of the at least one input image on a display device; C) adding, via a user input device associated with the display device, at least one reference indicator to the displayed at least one input image to provide a reference for a locate operation and thereby generate a marked-up digital image; D) providing, via the user input device, a description of a path to be followed during the locate operation with reference to the at least one reference indicator; and E) electronically transmitting and/or electronically storing information relating to the marked-up digital image together with information relating to the description of the path so as to facilitate the detection of the presence or the absence of the at least one underground facility within the dig area.

Another embodiment comprises at least one computer-readable medium encoded with instructions that, when executed by at least one processing unit, perform a method for facilitating detection of a presence or an absence of at least one underground facility within a dig area, wherein at least a portion of the dig area may be excavated or disturbed during excavation activities. The method comprises: A) electronically receiving source data representing at least one input image of a geographic area including the dig area; B) processing the source data so as to display at least a portion of the at least one input image on a display device; C) receiving user input, via a user input device associated with the display device; D) adding, based on the user input, at least one reference indicator to the displayed at least one input image to provide a reference for a locate operation and thereby generate a marked-up digital image; E) providing, via the user input device, a description of a path to be followed during the locate operation with reference to the at least one reference indicator; and F) electronically transmitting and/or electronically storing information relating to the marked-up digital image together with information relating to the description of the path so as to facilitate the detection of the presence or the absence of the at least one underground facility within the dig area.

A further embodiment comprises an apparatus for facilitating detection of a presence or an absence of at least one underground facility within a dig area, wherein at least a portion of the dig area may be excavated or disturbed during excavation activities. The apparatus comprises: a communication interface; a display device; a user input device; a memory to store processor-executable instructions; and a processing unit coupled to the communication interface, the display device, the user input device, and the memory, wherein upon execution of the processor-executable instructions by the processing unit. The processing unit: controls the communication interface to electronically receive source data representing at least one input image of a geographic area including the dig area; controls the display device to display at least a portion of the at least one input image; acquires at least one first user input from the user input device to provide a reference for a locate operation; generates a marked-up image including at least one reference indicator based on the user input; acquires at least one second user input from the user input device, the at least one second user input providing a description of a path to be followed during the locate operation with reference to the at least one reference indicator; and further controls the communication interface and/or the memory to electronically transmit and/or electronically store information relating to the marked-up digital image together with information relating to the description of the path so as to facilitate the detection of the presence or the absence of the at least one underground facility within the dig area.

Another embodiment comprises a method for facilitating detection of a presence or an absence of at least one underground facility within a dig area, wherein at least a portion of the dig area may be excavated or disturbed during excavation activities. The method comprising: A) electronically receiving source data representing at least one input image of a geographic area including the dig area; B) processing the source data so as to display at least a portion of the at least one input image on a display device; C) adding, via a user input device associated with the display device, at least one reference indicator to the displayed at least one input image to provide a reference for an area of planned excavation and thereby generate a marked-up digital image; D) providing, via the user input device, a description of the area of planned excavation with reference to the at least one reference indicator; and E) electronically transmitting and/or electronically storing information relating to the marked-up digital image together with information relating to the description of the area of planned excavation so as to facilitate the detection of the presence or the absence of the at least one underground facility within the dig area.

A further embodiment comprises at least one computer-readable medium encoded with instructions that, when executed by at least one processing unit, perform a method for facilitating detection of a presence or an absence of at least one underground facility within a dig area, wherein at least a portion of the dig area may be excavated or disturbed during excavation activities. The method comprises: A) electronically receiving source data representing at least one input image of a geographic area including the dig area; B) processing the source data so as to display at least a portion of the at least one input image on a display device; C) receiving user input, via a user input device associated with the display device; D) adding, based on the user input, at least one reference indicator to the displayed at least one input image to provide a reference for a locate operation and thereby generate a marked-up digital image; E) providing, via the user input device, a description of the area of planned excavation with reference to the at least one reference indicator; and F) electronically transmitting and/or electronically storing information relating to the marked-up digital image together with information relating to the description of the area of planned excavation so as to facilitate the detection of the presence or the absence of the at least one underground facility within the dig area.

Another embodiment comprises an apparatus for facilitating detection of a presence or an absence of at least one underground facility within a dig area, wherein at least a portion of the dig area may be excavated or disturbed during excavation activities. The apparatus comprises: a communication interface; a display device; a user input device; a memory to store processor-executable instructions; and a processing unit coupled to the communication interface, the display device, the user input device, and the memory, wherein upon execution of the processor-executable instructions by the processing unit. The processing unit: controls the communication interface to electronically receive source data representing at least one input image of a geographic area including the dig area; controls the display device to display at least a portion of the at least one input image; acquires at least one first user input from the user input device to provide a reference for a locate operation; generates a marked-up image including at least one reference indicator based on the user input; acquires at least one second user input from the user input device, the at least one second user input providing a description of the area of planned excavation with reference to the at least one reference indicator; and further controls the communication interface and/or the memory to electronically transmit and/or electronically store information relating to the marked-up digital image together with information relating to the description of the area of planned excavation so as to facilitate the detection of the presence or the absence of the at least one underground facility within the dig area.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention.

DETAILED DESCRIPTION

Following below are more detailed descriptions of various concepts related to, and embodiments of, inventive methods and apparatus according to the present disclosure for facilitating a locate operation using a virtual white line image. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Various embodiments described herein are directed to methods, apparatus and systems for creating an electronic record relating to a geographic area including a dig area to be excavated or otherwise disturbed. The electronic record may comprise a virtual white line (VWL) image indicating a point, line, and/or path of planned excavation. The VWL image may be created using a VWL application that allows a user to generate (e.g., draw) one or more virtual white lines for electronically indicating a point, line, and/or path of planned excavation. For example, using a drawing tool of the VWL application, a user may mark one or more virtual white lines on any digital image of the geographic location of the dig area to indicate the line or path of the planned excavation. The marked-up digital image (i.e., a VWL image) may be associated with a locate request (or ticket) and transmitted to the locate service provider for use during locate operations.

By indicating a point, line, and/or path of planned excavation, the VWL image may reduce, or even substantially eliminate, the amount of time spent by a locate technician reading and interpreting textual descriptions and/or interpreting verbal descriptions of the planned excavation. It should be appreciated, however, that the VWL image and/or the electronic record may optionally include textual descriptions and other information requiring interpretation. In addition, by visually and/or otherwise indicating a point, line, and/or path of planned excavation, the VWL image may rapidly orient the locate technician at the job site with respect to the precise location of the planned excavation. As a result, the locate operation may be performed more efficiently and more cost effectively. The VWL image may also reduce or eliminate uncertainty about the locate operation (e.g., by providing more information or providing information in a more useful format), which may reduce or eliminate the risk of damage.

Figure 1:
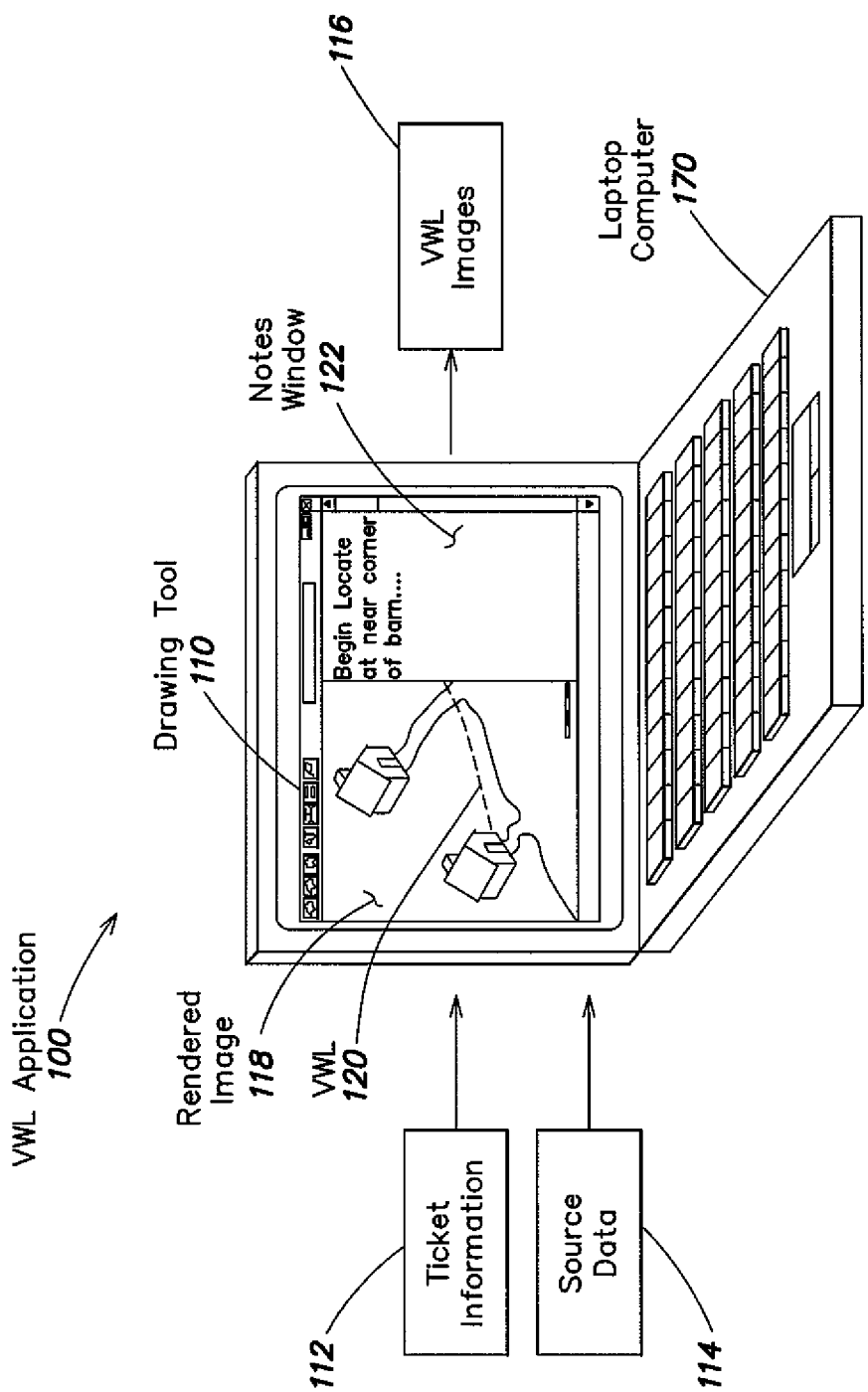
FIG. 1 illustrates a functional block diagram of a virtual white lines application for indicating a point, line, and/or path of planned excavation, according to the present disclosure.

Referring to FIG. 1, a functional block diagram of a VWL application 100 for indicating a point, line, and/or path of planned excavation is presented. In one embodiment, VWL application 100 of the present disclosure may be, for example, a web-based application that is accessible via the Internet. For example, a graphical user interface (GUI) that is accessible via the Internet may be associated with VWL application 100. VWL application 100 may provide a secure login function, which allows users, such as excavators and/or system administrators, to access the functions of VWL application 100. In one example, excavators may login to VWL application 100 and enter user-specific information which may be saved in, for example, a user profile. The user-specific information may include, for example, the user's name, user-ID, and excavation company name. In another embodiment, VWL application 100 may be a desktop application that is running on the user's local computing device.

VWL application 100 may include, but is not limited to, a drawing tool 110. Certain inputs to VWL application 100 may include, but are not limited to, ticket information 112, and source data 114. The output of VWL application 100 may include, but is not limited to, one or more VWL images 116.

Drawing tool 110 may be used to create an electronic record relating to a geographic area including a dig area to be excavated or otherwise disturbed. As part of the electronic record, the dig area may be somehow identified with respect to its immediate surroundings in the geographic area. For example, source data 114 representing one or more input images of a geographic area including the dig area is received and/or processed so that the input image(s) may be displayed on a display device. The dig area is then indicated in some manner on the displayed input image(s) 118 so as to generate one or more marked-up images constituting at least a portion of the electronic record. In some implementations of the inventive concepts disclosed herein, the electronic record may include a variety of non-image information to facilitate identification of the dig area (e.g., a text description of the dig area, an address or lot number of a property within which the dig area is located, geo-encoded information such as geographic coordinates relating to the dig area and/or various aspects of the geographic area surrounding the dig area, etc.). The marked-up image(s) and the non-image information may be formatted in a variety of manners in the electronic record; for example, in one implementation the non-image information may be included as metadata associated with the marked-up image(s), while in another implementation the marked-up image(s) and the non-image information may be formatted as separate data sets. These separate data sets may be transmitted and/or stored separately, but may nonetheless be linked together in some manner as relating to a common electronic record.

The exemplary displayed input image 118 shown in FIG. 1, displayed on a laptop computer 170, provides a view of the geographic area surrounding the dig area. Various embodiments relating to the inventive concepts disclosed herein enable excavators, one-call centers, or other users to indicate the dig area on one or more displayed input images. For purposes of the present disclosure, an input image is any image represented by source data that is electronically processed (e.g., the source data is in a computer-readable format) to display the image on a display device. An input image may include any of a variety of paper/tangible image sources that are scanned (e.g., via an electronic scanner) or otherwise converted so as to create source data (e.g., in various formats such as XML, PDF, JPG, BMP, etc.) that can be processed to display the input image. An input image also may include an image that originates as source data or an electronic file without necessarily having a corresponding paper/tangible copy of the image (e.g., an image of a "real-world" scene acquired by a digital still frame or video camera or other image acquisition device, in which the source data, at least in part, represents pixel information from the image acquisition device).

In some exemplary implementations, input images according to the present disclosure may be created, provided, and/or processed by a geographic information system (GIS) that captures, stores, analyzes, manages and presents data referring to (or linked to) location, such that the source data representing the input image includes pixel information from an image acquisition device (corresponding to an acquired "real world" scene or representation thereof), and/or spatial/geographic information ("geo-encoded information"). In this manner, a GIS provides a framework for data manipulation and display of images that may facilitate one or more of (a) location verification, (b) location correlation, (c) locational relationships, (d) district coding, (e) route analysis, (f) area analysis and (g) mapping/display creation, for example.

Figure 6:
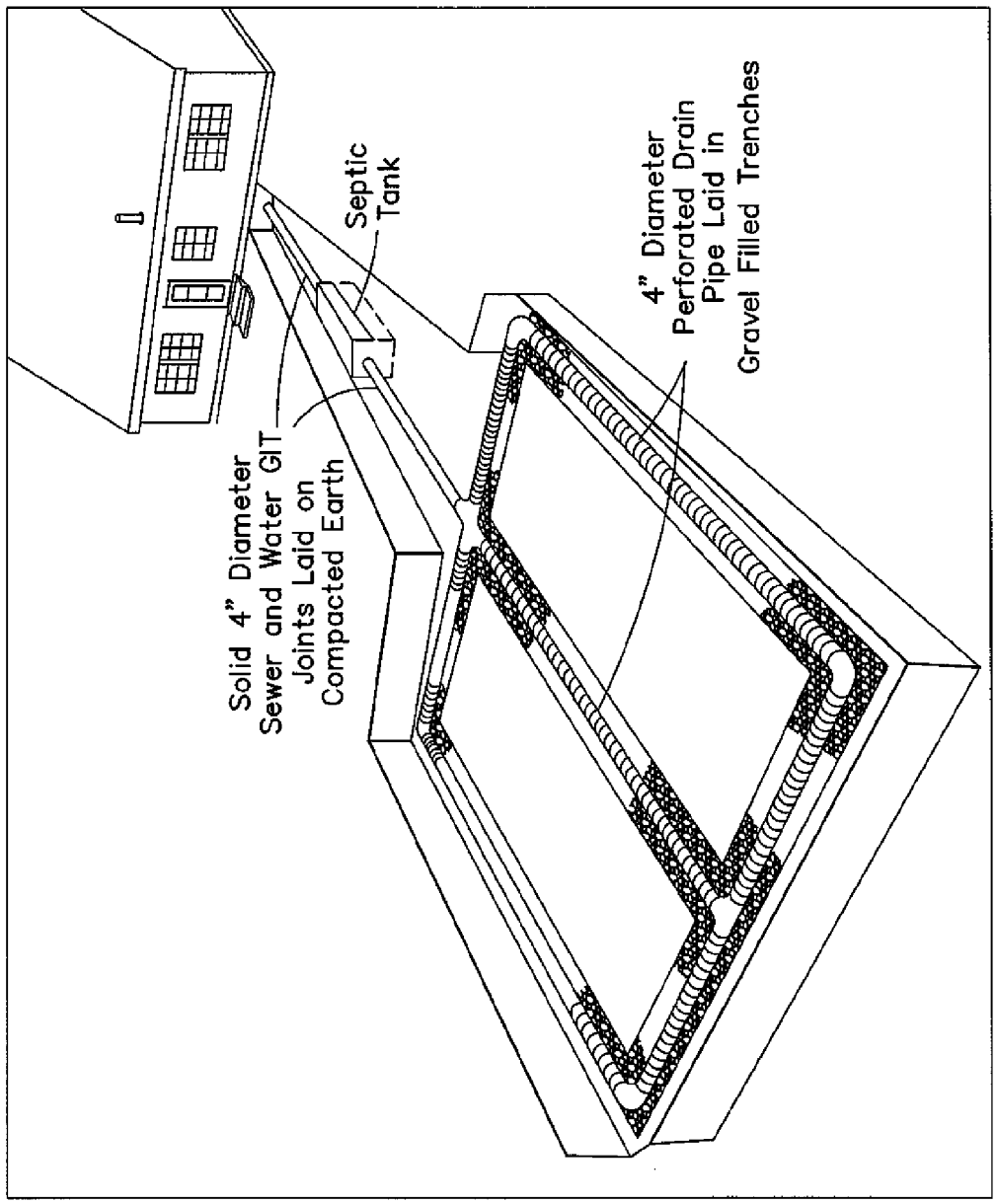
FIG. 6 shows a sketch 600, representing an exemplary input image.
Figure 7:
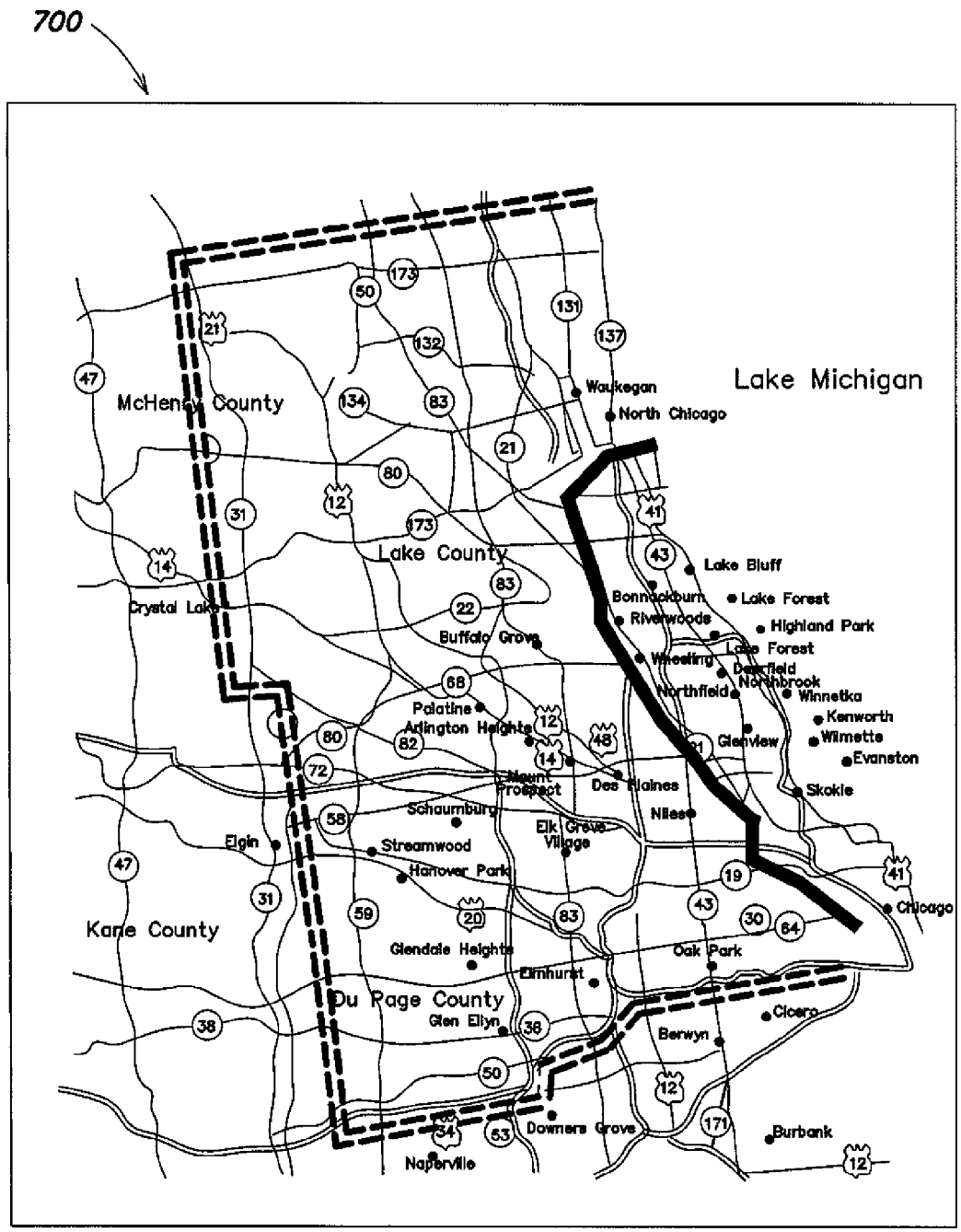
FIG. 7 shows a map 700, representing an exemplary input image.
Figure 8:
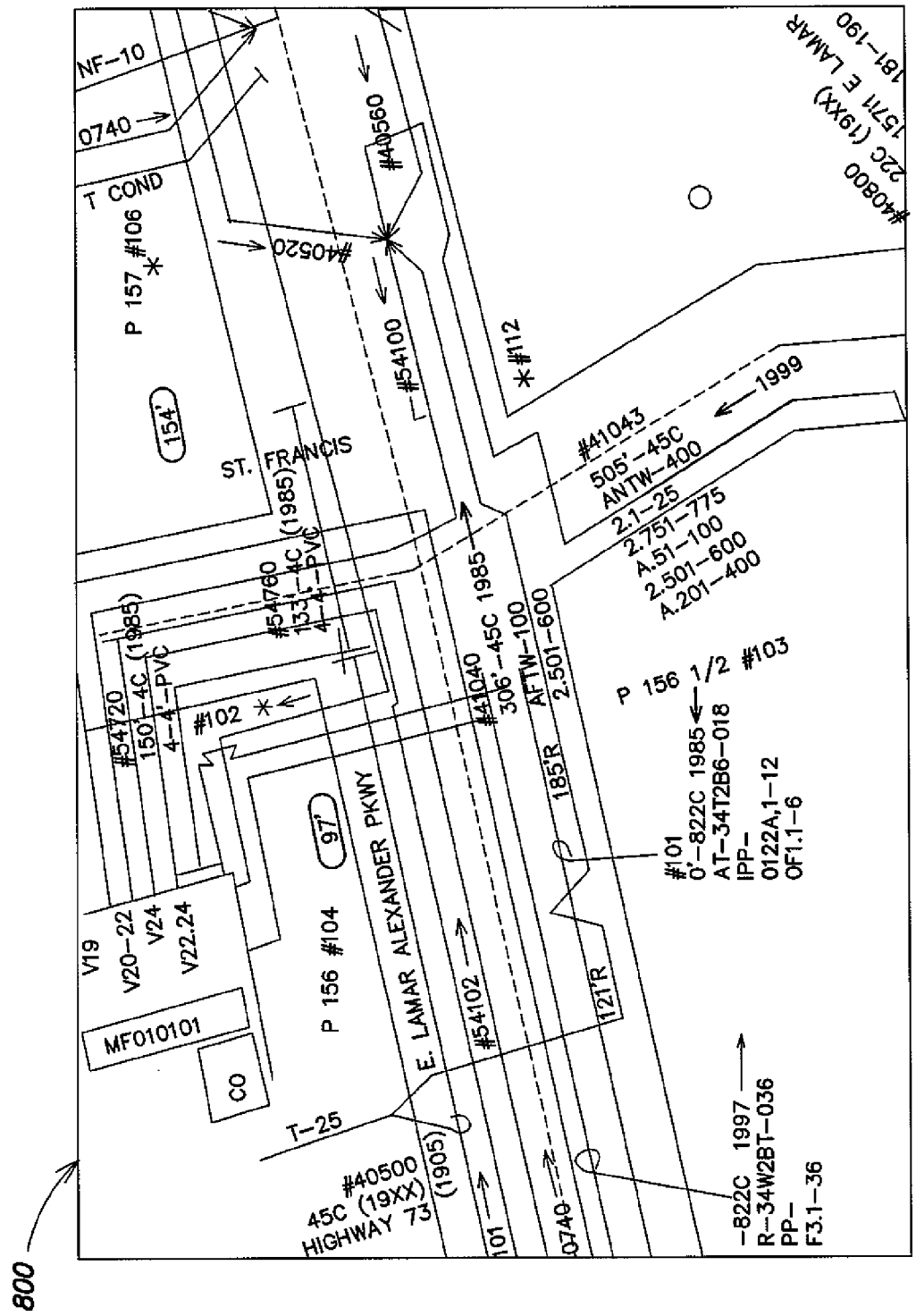
FIG. 8 shows a facility map 800, representing an exemplary input image.
Figure 9:
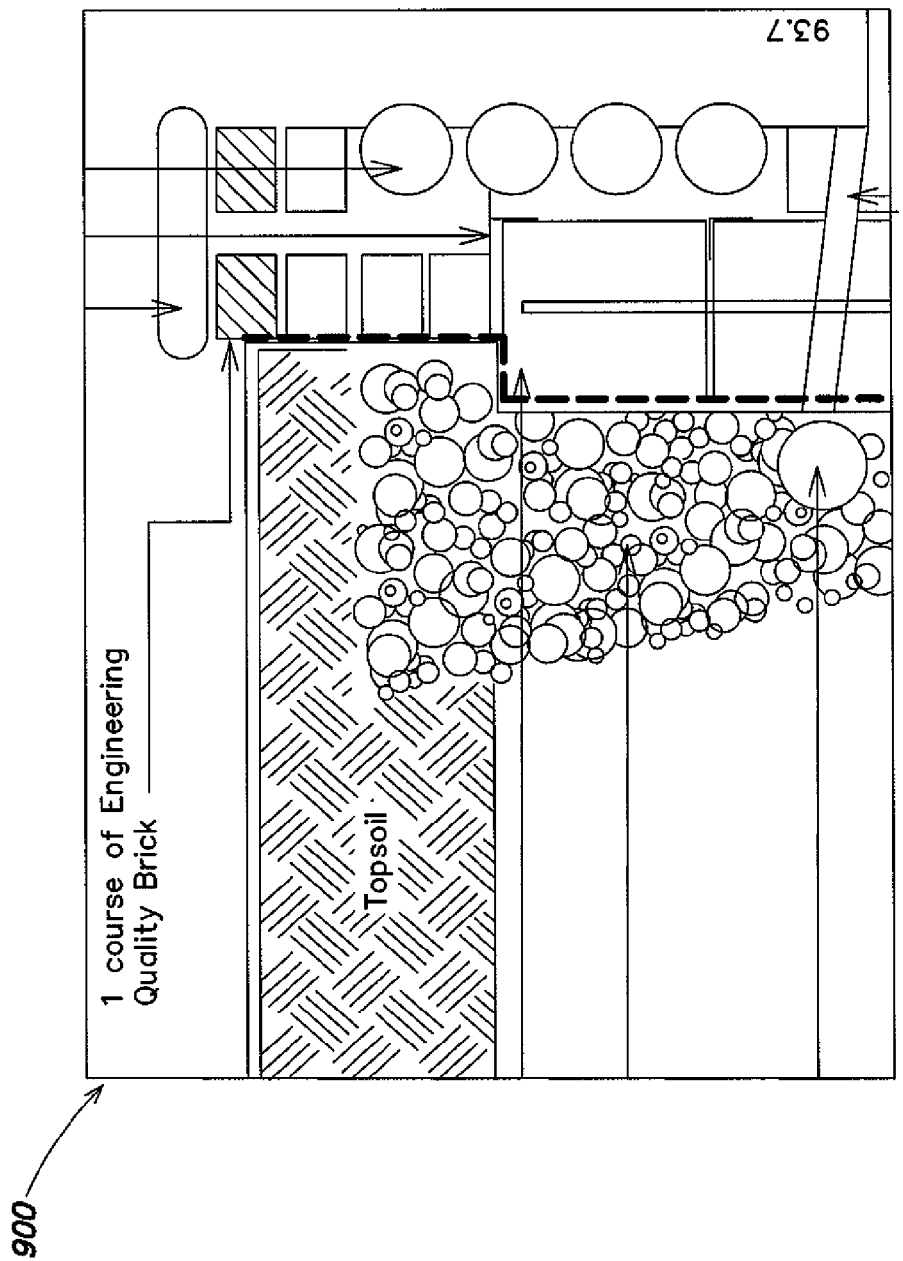
FIG. 9 shows a construction/engineering drawing 900, representing an exemplary input image.
Figure 10:
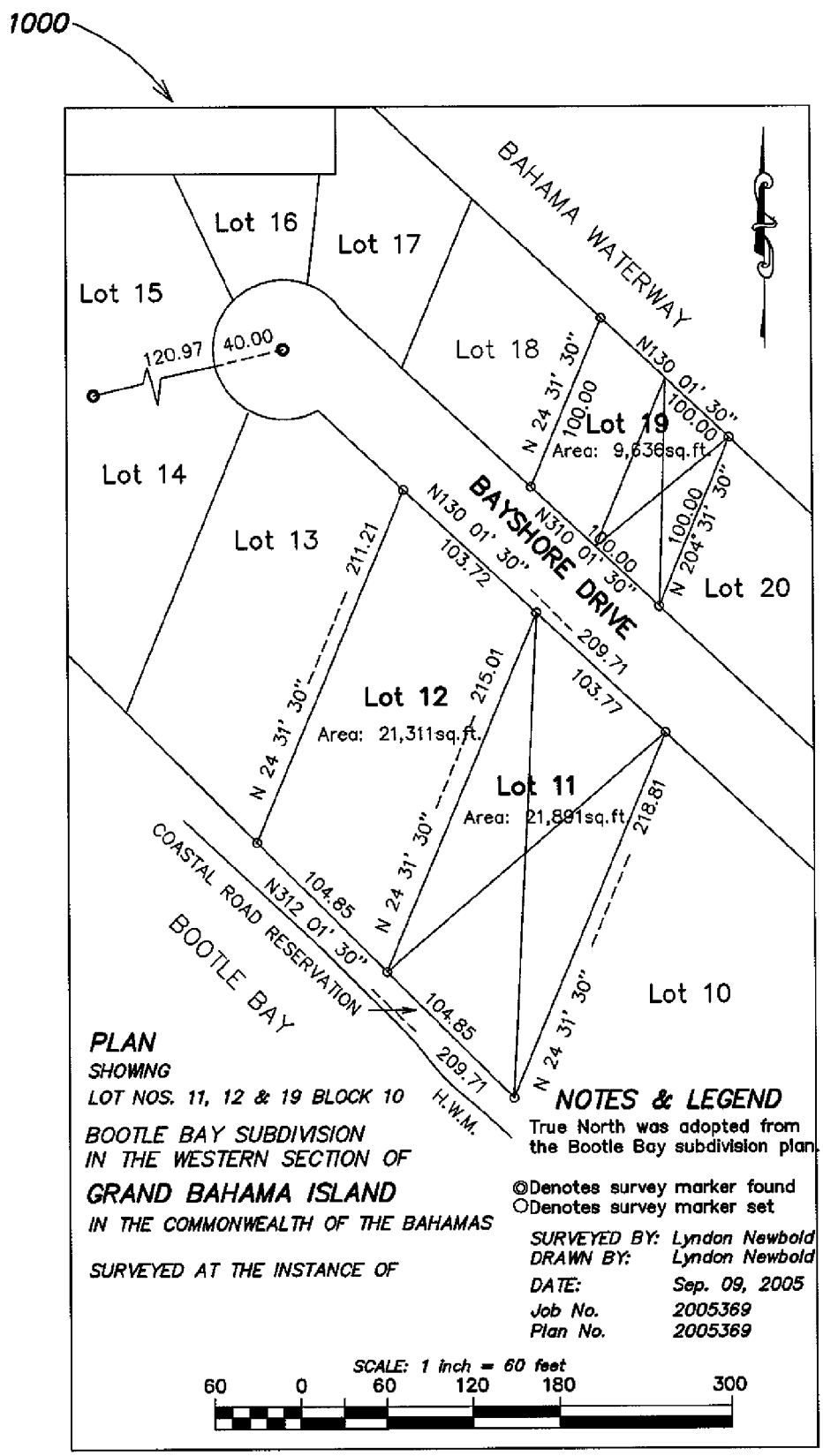
FIG. 10 shows a land survey map 1000, representing an exemplary input image.
Figure 11:
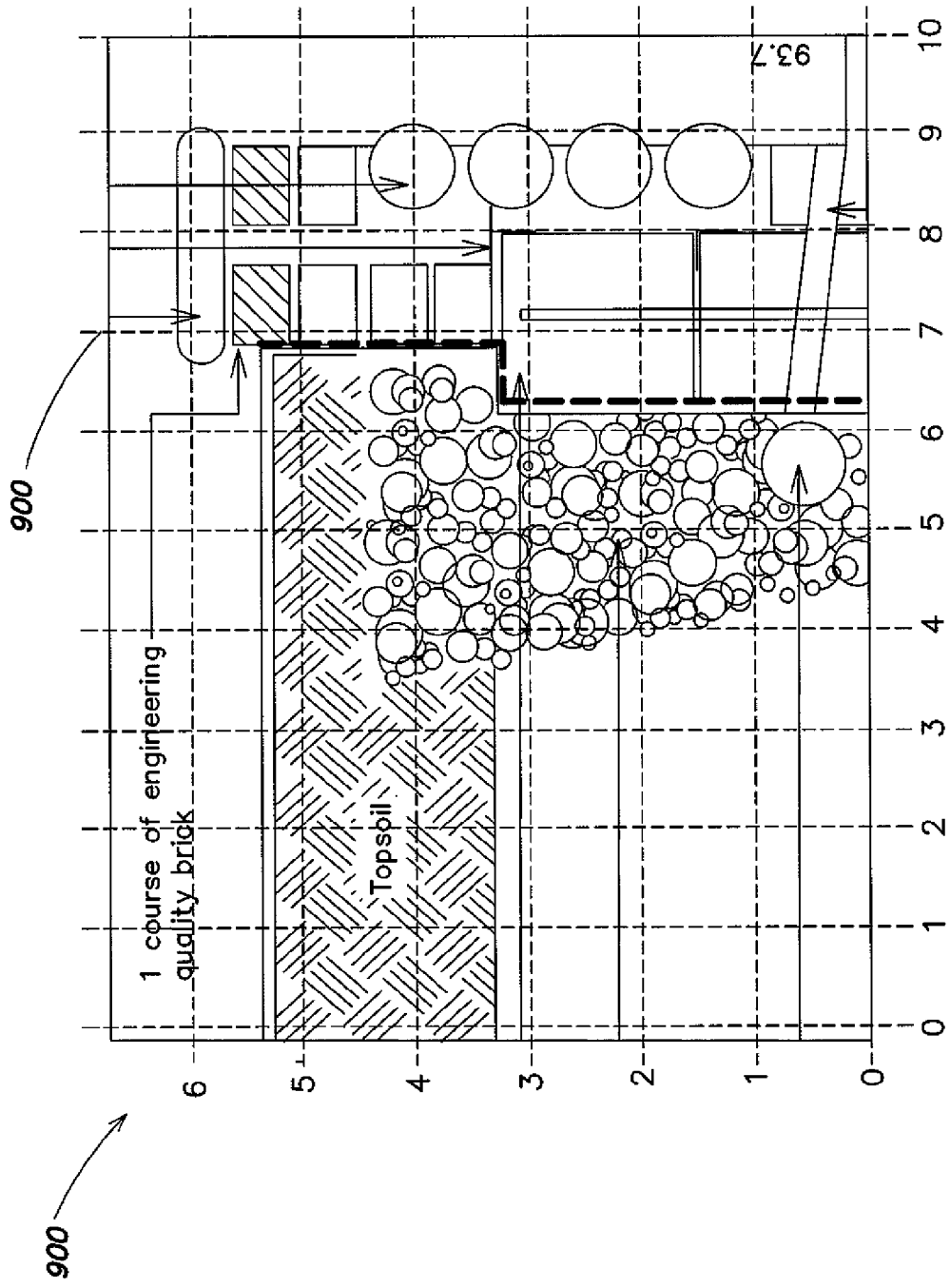
FIG. 11 shows a grid 1100, overlaid on the construction/engineering drawing 900 of FIG. 9 representing an exemplary input image.
Figure 12:
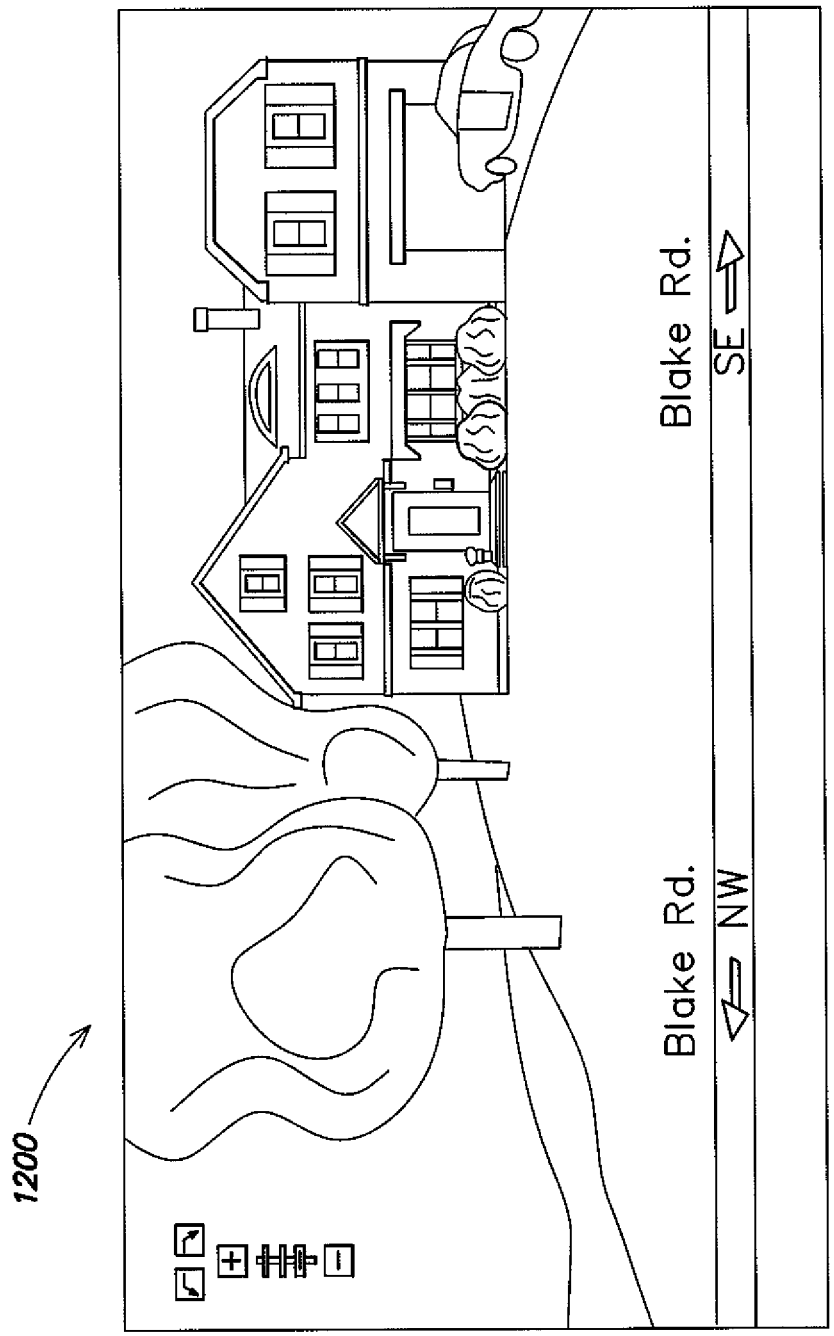
FIG. 12 shows a street level image 1200, representing an exemplary input image.

In view of the foregoing, various examples of input images and source data representing input images according to the present disclosure, to which the inventive concepts disclosed herein may be applied, include but are not limited to:

Manual "free-hand" paper sketches of the geographic area (which may include one or more buildings, natural or man-made landmarks, property boundaries, streets/intersections, public works or facilities such as street lighting, signage, fire hydrants, mail boxes, parking meters, etc.). FIG. 6 shows an exemplary sketch 600;

Various maps indicating surface features and/or extents of geographical areas, such as street/road maps (e.g., map 700 of FIG. 7), topographical maps, military maps, parcel maps, tax maps, town and county planning maps, call-center and/or facility polygon maps, virtual maps, etc. (such maps may or may not include geo-encoded information);

Facility maps illustrating installed underground facilities, such as gas, power, telephone, cable, fiber optics, water, sewer, drainage, etc. Facility maps may also indicate street-level features (streets, buildings, public facilities, etc.) in relation to the depicted underground facilities. Examples of facility maps include CAD drawings that may be created and viewed with a GIS to include geo-encoded information (e.g., metadata) that provides location information (e.g., infrastructure vectors) for represented items on the facility map. An exemplary facility map 800 is shown in FIG. 8;

Architectural, construction and/or engineering drawings and virtual renditions of a space/geographic area (including "as built" or post-construction drawings). An exemplary construction/engineering drawing 900 is shown in FIG. 9;

Land surveys, i.e., plots produced at ground level using references to known points such as the center line of a street to plot the metes and bounds and related location data regarding a building, parcel, utility, roadway, or other object or installation. FIG. 10 shows an exemplary land survey map 1000;

A grid (a pattern of horizontal and vertical lines used as a reference) to provide representational geographic information (which may be used "as is" for an input image or as an overlay for an acquired "real world" scene, drawing, map, etc.). An exemplary grid 1100, overlaid on construction/engineering drawing 900, is shown in FIG. 11. It should be appreciated that the grid 1100 may itself serve as the input image (i.e., a "bare" grid), or be used together with another underlying input image;

"Bare" data representing geo-encoded information (geographical data points) and not necessarily derived from an acquired/captured real-world scene (e.g., not pixel information from a digital camera or other digital image acquisition device). Such "bare" data may be nonetheless used to construct a displayed input image, and may be in any of a variety of computer-readable formats, including XML); and Photographic renderings/images, including street level (see e.g., street level image 1200 of FIG. 12), topographical, satellite, and aerial photographic renderings/images, any of which may be updated periodically to capture changes in a given geographic area over time (e.g., seasonal changes such as foliage density, which may variably impact the ability to see some aspects of the image).

It should also be appreciated that source data representing an input image may be compiled from multiple data/information sources; for example, any two or more of the examples provided above for input images and source data representing input images, or any two or more other data sources, can provide information that can be combined or integrated to form source data that is electronically processed to display an image on a display device.

In some implementations an input image may be indexed to Global Positioning System (GPS) coordinates or another coordinate system that provides geo-spatial positioning. An input image may include geo-coding or other geographical identification metadata and may be provided in any computer-readable format. An input image may also include images of map symbols, such as roads and street names, that may be superimposed upon or displayed separately from an underlying geographic area when the input image is displayed on a display device.

With reference again to FIG. 1, "virtual white lines" 120 may be added to the displayed input image 118 to graphically delimit the dig area 100. Virtual white lines 120 may be added to the displayed input image 118 through the use of a drawing application, or dig area marking tool application, which may superimpose over or otherwise display the virtual white lines 120 on the displayed input image 118. As used herein, "virtual white lines" may include lines, drawing shapes, shades, symbols, coordinates, data sets, or other indicators to provide one or more indications of or delimit the dig area on a displayed input image.

The exemplary embodiments described herein may additionally communicate to the underground facility owner the marked-up images which indicate the boundary of the dig area both graphically and as a series of geographical coordinates. These marked-up images and coordinates enable locate technicians who are dispatched to locate the existing underground facilities to know with precision the dig area in which excavating activities are planned to occur regardless of whether physical white lines exist or whether a description of the area has been accurately provided. Implementations described herein may give excavators the ability to provide one call centers with virtual white lines as part of a locate request. Other implementations may provide virtual white lines to facility owners subsequent to the initial locate request to the one call center.

Use of virtual white lines, as described herein, may eliminate the uncertainty associated with imprecise excavator locate requests. Thus, underground facility owners may determine the presence of their underground facilities within a correctly communicated and certain dig area and mark the location of their facilities where excavators in fact plan to excavate. The precision and permanency of virtual white lines may reduce the occurrence of underground facilities not being marked within a dig area. Also, use of virtual white lines may result in less field communication between excavators and locate technicians about imprecise dig area descriptions and may reduce confusion about the exact location of a dig area. Confusion about precise dig area locations can result in costly damages to underground facilities which may imperil the general public. When excavators inadvertently excavate at locations where underground facility owners have not located existing underground facilities, damages to underground facilities are highly likely. Additionally, in jurisdictions where excavators are required to physically "white line" the dig area, implementations described herein may enable excavators (if they so choose and are permitted to do so) to identify the dig area boundaries with precision without being required to physically visit the site. The digital description of the dig area, on a displayed and marked-up input image as generated by exemplary embodiments described herein, also creates a permanent record of the dig area that is associated with each locate request by an excavator.

Once read into VWL application 100 from source data 114, the digital image and/or electronic data may be rendered in the viewing window of drawing tool 110. In one example, FIG. 1 shows a rendered image 118 that is displayed in the viewing window of drawing tool 110. The markings that the excavator adds to rendered image 118 are used to graphically indicate the dig area. For example and referring to FIG. 1, drawing tool 110 may be used to superimpose over or otherwise display one or more "virtual white lines" (VWL) 120 for indicating a point, line, and/or path of planned excavation upon rendered image 118. As used herein, the virtual white lines may include points and/or lines, such as single segment lines, multiple-segment lines, substantially straight lines, curved lines, and the like.

A marked-up VWL image may be provided in a method that involves sending an image to a user via a network; receiving a marked-up version of the image from the user via the network that includes one or more virtual white lines added to the image that indicate a dig area in which excavation is planned; and providing the marked-up version of the image, via one of an electronic or tangible delivery system, to another entity.

The virtual white lines may include two-dimensional (2D) drawing shapes, shades, points, symbols, coordinates, data sets, or other indicators to indicate on a digital image the dig area in which excavation is to occur. In addition, as described herein, the VWL application 100 of the present disclosure provides the ability to create one-dimensional (1D) virtual white lines for indicating a point, line, and/or path of planned excavation.

Referring again to FIG. 1, drawing tool 110 of VWL application 100 also provides text editing capability. This text editing capability allows textual notes to be superimposed over or otherwise displayed upon and/or along side of rendered image 118. For example, textual information may be entered manually by excavators in a notes window 122. Other textual information may originate from ticket information 112 that may be read into VWL application 100. For example, the ticket number, location information (e.g., address), excavator information, and/or one-call center information may be read into VWL application 100 from ticket information 112 and automatically included in textual information and/or the metadata that may be associated with VWL images 116.

When an excavator completes the sketch of the one or more VWL 120 upon rendered image 118 and/or completes adding textual notes upon rendered image 118, the resulting marked-up image may be saved as a VWL image 116. One or more VWL images 116 may be associated with a ticket. VWL image 116 may be saved in any standard image and/or electronic data format. In one example, VWL image 116 may be saved in any standard digital image file format, such as, but not limited to, JPG, BMP, TIFF, and PDF file format. In another example, VWL image 116 may be saved in XML file format.

It should be appreciated that the virtual white lines application for indicating a point, line, and/or path of planned excavation described in connection with FIG. 1 is merely exemplary and that many implementations of such an application are possible. For example, the drawing application or dig area marking tool application described in each of U.S. patent application Ser. No. 12/366,853 entitled "VIRTUAL WHITE LINES FOR INDICATING PLANNED EXCAVATION SITES ON ELECTRONIC IMAGES" filed on Feb. 6, 2009, and U.S. patent application Ser. No. 12/050,555 entitled "VIRTUAL WHITE LINES FOR DELIMITING PLANNED EXCAVATION SITES" filed on Mar. 18, 2008, which are hereby incorporated by reference herein in their entireties, may be configured to indicate a point, line, and/or path of planned excavation, as described herein. In addition, the user device described in each of U.S. patent application Ser. Nos. 12/366,853 and 12/050,555 may be used as a hardware interface to create the multi-generational VWL images described herein.

Figure 2:
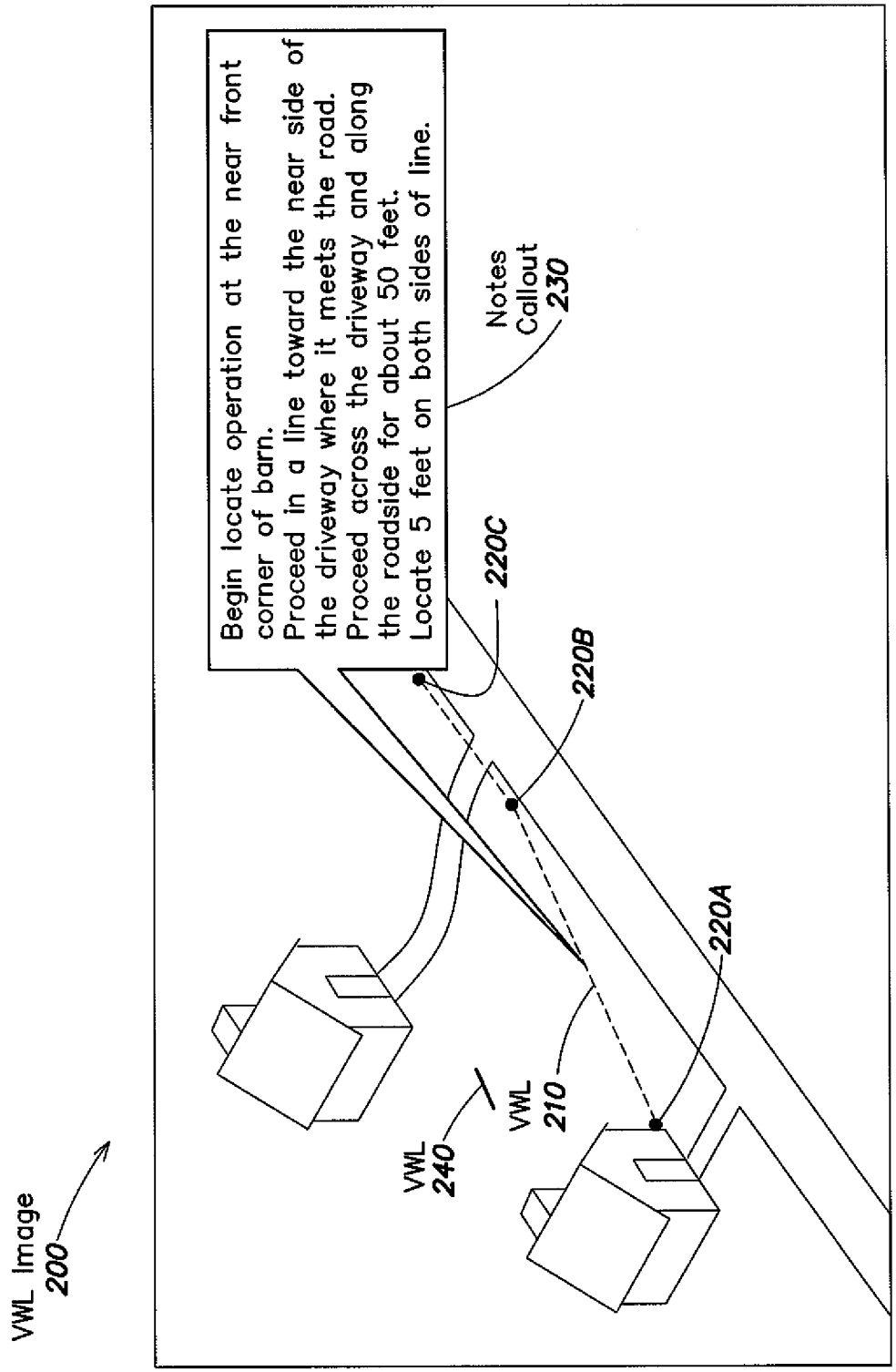
FIG. 2 illustrates an example of a virtual white lines image, which shows more details of virtual white lines for indicating a point, line, and/or path of planned excavation, according to the present disclosure.
Figure 3:
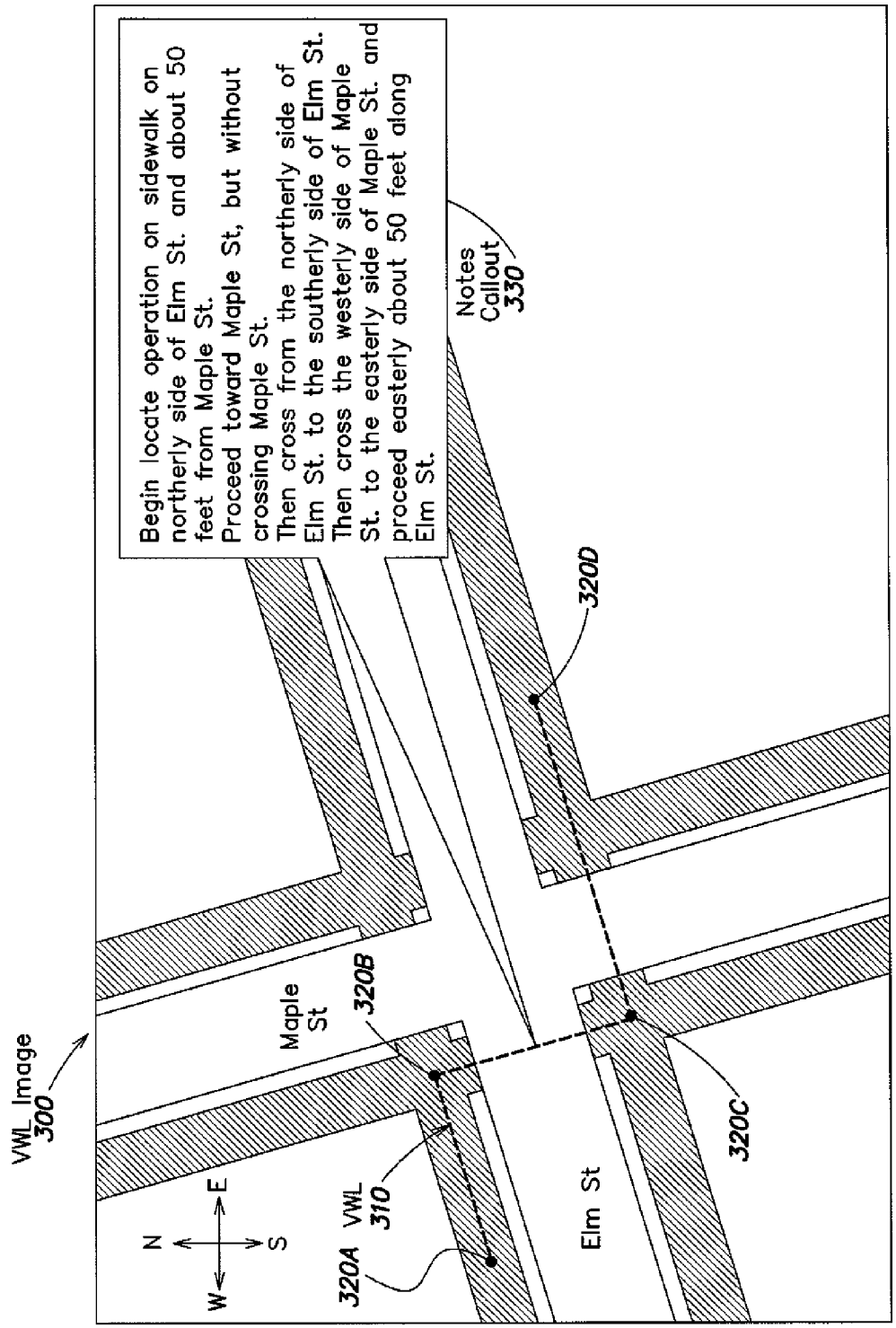
FIG. 3 illustrates another example of a virtual white lines image, which shows more details of virtual white lines for indicating a point, line, and/or path of planned excavation, according to the present disclosure.

With respect to a point, line, and/or path of planned excavation, examples of VWL images 116 that may be created using VWL application 100 are shown with reference to FIGS. 2 and 3. Referring to FIG. 2, a view of a VWL image 200, which shows more details of virtual white lines for indicating a point, line, and/or path of planned excavation, is presented. VWL image 200 is an example of a VWL image 116 of FIG. 1.

VWL image 200 may be, for example, a marked-up aerial image of the geographic location of the dig area of a certain ticket. By way of example, VWL image 200 is a marked-up image of a certain residential property location. VWL image 200 shows a VWL 210 that has been marked by, for example, an excavator to indicate a point, line, and/or path of planned excavation. In this example, VWL 210 is formed of two line segments, e.g. segments 220A-220B and 220B-220C. VWL 210 may represent the center line with respect to the line or path of planned excavation. It may be the intent of the excavator to have a locate operation covering a certain area along both sides of VWL 210, VWL 210 being the center line of the locate operation. For example, it may be the intent of the excavator to have a locate operation covering 5 feet on both sides of VWL 210, VWL 210 being the center line of the locate operation.

Additionally, VWL image 200 shows another example (aside from notes window 122 of FIG. 1) of a mechanism for manually adding textual information to a VWL image. For example, with respect to VWL 210, a notes callout 230 may be provided where the excavator may enter certain notes about the line or path of planned excavation. By way example, the textual information with respect to VWL 210 may be as follows . . . "Begin locate operation at the near front corner of barn. Proceed in a line toward the near side of the driveway where it meets the road. Proceed across the driveway and along the roadside for about 50 feet. Locate 5 feet on both sides of line."

VWL image 200 also shows a VWL 240, which may indicate a point of planned excavation. For example, it may be the intent of the excavator to have a locate operation covering a certain radius (e.g., a 5-foot radius) around VWL 240, VWL 240 being the center point of the locate operation.

Referring to FIG. 3, a view of a VWL image 300, which shows more details of virtual white lines for indicating a point, line, and/or path of planned excavation, is presented. VWL image 300 is another example of a VWL image 116 of FIG. 1.

VWL image 300 may be, for example, a marked-up aerial image of the geographic location of the dig area of a certain ticket. By way of example, VWL image 300 is a marked-up image of the intersection of two streets (e.g., Maple St and Elm St). VWL image 300 shows a VWL 310 that has been marked by, for example, an excavator to indicate a point, line, and/or path of planned excavation. In this example, VWL 310 is formed of three line segments, e.g. segments 320A-320B, 320B-320C, and 320C-320D. VWL 310 may represent the center line with respect to the line or path of planned excavation. It may be the intent of the excavator to have a locate operation covering a certain area along both sides of VWL 310, VWL 310 being the center line of the locate operation. For example, it may be the intent of the excavator to have a locate operation covering 5 feet on both sides of VWL 310, VWL 310 being the center line of the locate operation.

Additionally, VWL image 300 shows another example (aside from notes window 122 of FIG. 1) of a mechanism for manually adding textual information to a VWL image. For example, a notes callout 330 may be provided where the excavator may enter certain notes about the line or path of planned excavation. By way example, the textual information with respect to VWL 310 may be as follows . . . "Begin locate operation on sidewalk on northerly side of Elm St and about 50 feet from Maple St. Proceed toward Maple St, but without crossing Maple St. Then cross from the northerly side of Elm St to the southerly side of Elm St. Then cross from the westerly side of Maple St to the easterly side of Maple St and proceed easterly about 50 feet along Elm St."

Referring again to FIGS. 2 and 3, when made available to locate personnel, a VWL image, such as VWL image 200 and 300, and the information thereof provides precise clarity as to the scope of the locate operation. In particular, a VWL image, such as VWL image 200 and 300, is useful to rapidly orient the locate technician at the job site with respect to the precise location of the planned excavation.

Figure 4:
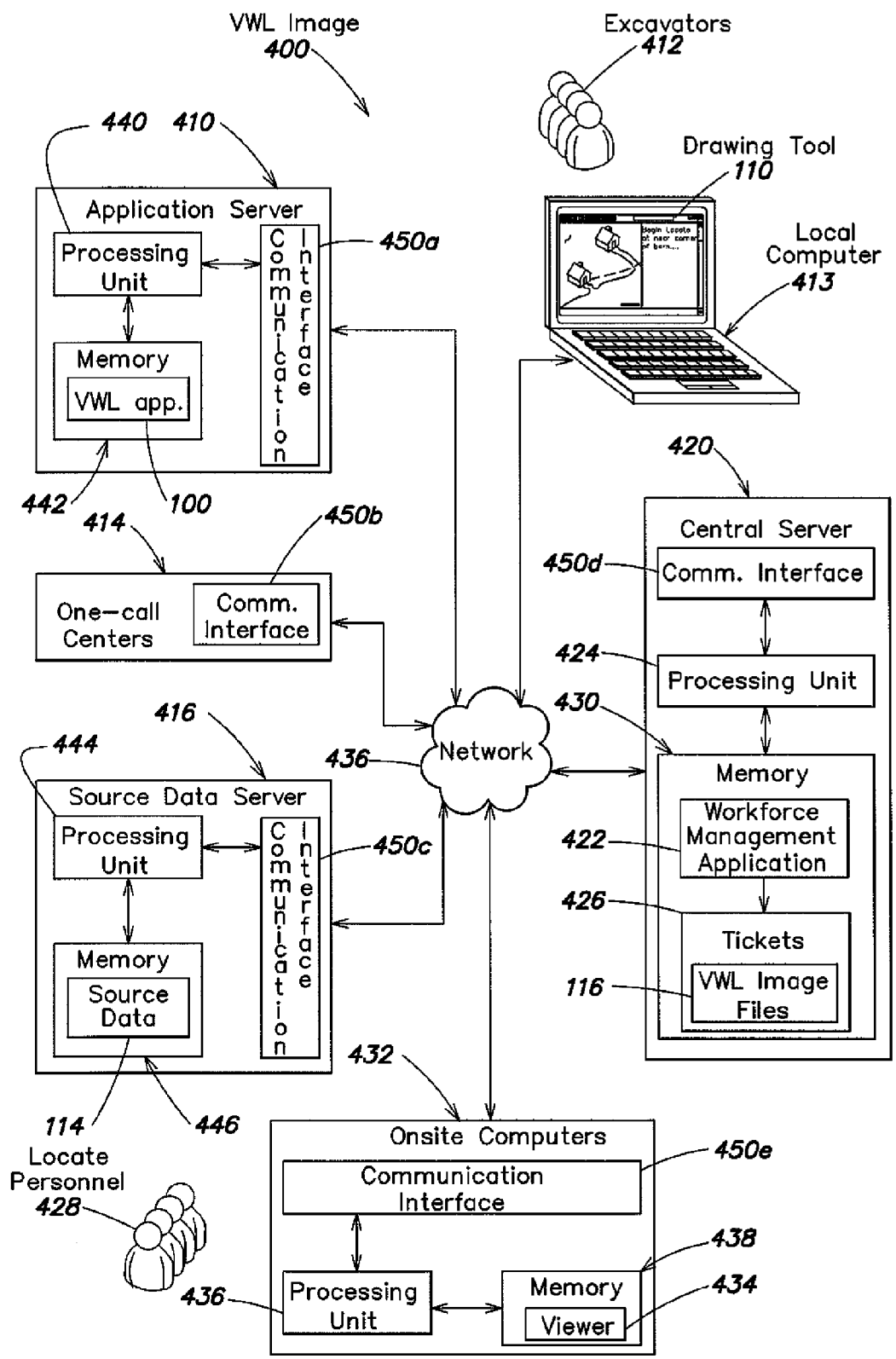
FIG. 4 illustrates a functional block diagram of a virtual white lines system that includes the virtual white lines application, according to the present disclosure.

Referring to FIG. 4, a functional block diagram of a VWL system 400 that includes VWL application 100 is presented. VWL system 400 of the present disclosure may include an application server 410, upon which resides VWL application 100 that is described with reference to FIGS. 1 through 3. VWL application 100 is stored in memory 442 and executed by processing unit 440. Application server 410 may be any application server, such as a web application server and/or web portal, by which one or more excavators 412 may access VWL application 100 with respect to generating virtual white lines for indicating a point, line, and/or path of planned excavation. Application server 410 may be accessed by excavators 412 via any networked computing device, such as his/her local computer 413. Excavators 412 may be any personnel associated with excavation companies (not shown), such as, but not limited to, individuals who are requesting and/or performing excavation activities.

VWL system 400 of the present disclosure may further include one or more one-call centers 414. One-call centers 414 may be any organizations, entities, and/or systems that receive, process, and/or transmit locate requests. The locate request (or ticket) may be any communication or instruction to perform a locate operation. One-call centers are generally owned, controlled, or funded by underground facility owners, such as telephone companies, cable television multiple system operators, electric utilities, gas utilities, or others. One-call center operations may be managed by a non-profit entity or outsourced to a for-profit firm. Excavators, such as excavators 412, are required to notify one-call centers in advance of their excavation activities and identify through the locate request the dig area where individual excavating activities will be performed. Locate requests consist of information supplied by the excavator to the one-call center regarding the specific geographic location of the dig area, date, time, purpose of excavation, and so on. The locate request, in turn, requires activity from an underground facility owner to perform a locate operation in the specified dig area. With respect to VWL system 400, a locate request (or ticket) that may be processed by one-call centers 414 may have a VWL image associated therewith.

VWL system 400 of the present disclosure may further include a source data server 416, which is one example of an entity supplying source data 114 of FIG. 1. Source data server 416 may be any computer device for storing and providing source data 114 of geographic locations. In FIG. 4, source data server 416 includes memory 446 that stores source data 114 and a processing unit 444 coupled to memory.

VWL system 400 of the present disclosure may further include a central server 420 that may be associated with, for example, a locate service provider. A workforce management application 422 is stored on memory 430 and executed by processor 424. Workforce management application 422 processes the output of the VWL application 100 and dispatches tickets 426 to locate personnel 428. The tickets 426 may have one or more VWL images 116 associated therewith. Locate personnel 428 may be, for example, locate technicians and/or quality control technicians that, for example, perform locate operations.

Tickets 426 that are dispatched from central server 420 may be received by locate personnel 428 via one or more onsite computers 432. Each onsite computer 432 may be a computer including processing unit 436 and memory 438, such as, but not limited to, a computer that is present in the vehicle that is being used by locate personnel 428. Each onsite computer 432 may be, for example, any computing device, such as portable computer, a personal computer, a tablet device, a PDA, a cellular radiotelephone, a mobile computing device, a touch-screen device, a touchpad device, or generally any device including, or connected to, a processor and a user interface. Preferably, onsite computer 432 is a portable computing device, such as laptop computer or tablet device. Residing in memory 438 of onsite computer 432, may be certain tools, such as a viewer 434, which may be executed by processing unit 436. Viewer 434 may be any viewer application that is capable of reading and displaying ticket information and/or digital images, such as VWL images 116. More details of a method of operation and/or using VWL system 400 are described with reference to FIG. 5.

A network 436 provides the communication link between any and/or all entities of VWL system 400. For example, network 436 provides the communication network by which information may be exchanged between application server 410, local computer 413, one-call centers 414, source data server 416, central server 420 and onsite computers 432. Network 436 may be, for example, any local area network (LAN) and/or wide area network (WAN) for connecting to the Internet.

In order to connect to network 436, each entity of VWL system 400 includes a communication interface. For example, the respective communication interfaces 450a-e of application server 410 one-call centers 414, source data server 416, central server 420 and onsite computers 432, as well as the communication interface of local computer 413, may be any wired and/or wireless communication interface by which information may be exchanged between any entities of VWL system 400. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols.

VWL system 400 is not limited to the types and numbers of entities that are shown in FIG. 4. Any types and numbers of entities that may be useful in underground facilities locate applications may be included in VWL system 400.

Figure 5:
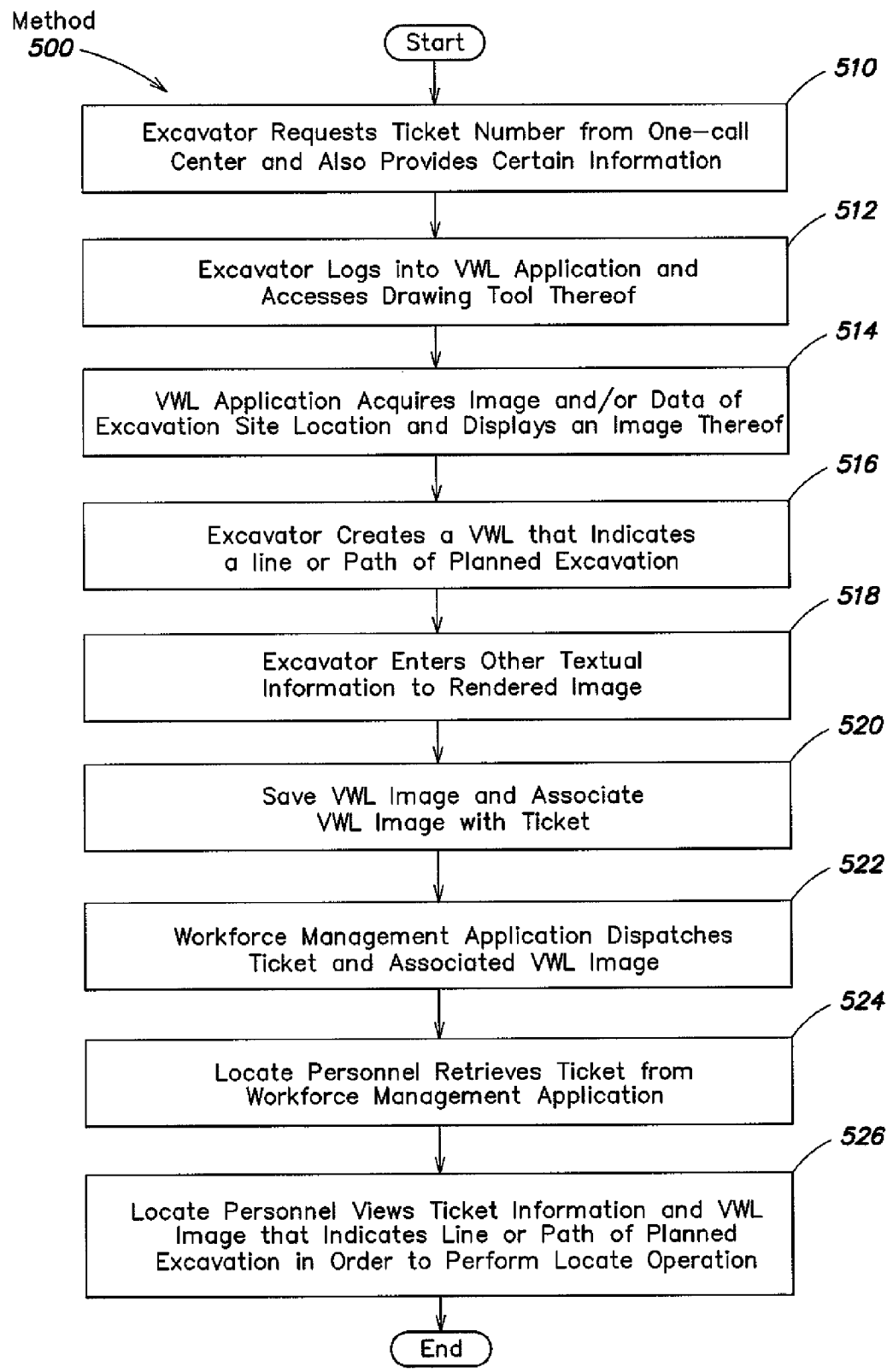
FIG. 5 illustrates a flow diagram of an example of a method of operation and/or of using the virtual white lines system, according to the present disclosure.

Referring to FIG. 5, a flow diagram of an example of a method 500 of operation and/or of using VWL system 400 is presented. Method 500 may include, but is not limited to, the following steps, which are not limited to any order.

At step 510, a certain excavator 412 requests a ticket number from a certain one-call center 414 and also provides other information. In particular, the excavator 412 calls and/or accesses a web portal of the one-call center 414 and requests a ticket number. Furthermore, the excavator 412 may provide other information, such as, but not limited to, the excavator's name, excavation company name, excavation company location, and the dig area address and/or other location information.

At step 512, the certain excavator 412 logs into VWL application 100 of the present disclosure and enters certain information. For example, using the Internet browser of any networked computer, the excavator 412 logs into VWL application 100 at application server 410 in order to access drawing tool 110.

At step 514, VWL application 100 acquires an image and/or electronic data comprising the excavation site location from source data 114 and displays an image thereof in drawing tool 110. In one example, location information of the proposed dig area, such as the address and/or any other location information (e.g., latitude/longitude coordinates), may be automatically read into VWL application 100 from ticket information 112. Subsequently, VWL application 100 automatically queries source data server 416 for the corresponding source data 114, which is read into the application and rendered in drawing tool 110. In another example, VWL application 100 provides a mechanism by which the excavator 412 may view and pan over an aerial map of a region and then manually identify the location of the proposed dig area. Once manually identified, the source data 114 that corresponds to the aerial map is read into the application and rendered in drawing tool 110.

At step 516, the excavator 412 creates a VWL that indicates a point, line, and/or path of planned excavation. By way of example and referring again to FIG. 2, the excavator 412 creates VWL 210 on the image that is displayed in drawing tool 110, which indicates a point, line, and/or path of the planned excavation.

At step 518, the excavator 412 enters other textual information and saves the VWL image. For example, the excavator 412 enters other descriptive text that may be superimposed over or otherwise displayed upon and/or along side of the rendered image. In one example, the excavator 412 enters textual information in notes window 122 of drawing tool 110. In another example, the excavator 412 enters textual information in one or more callout windows, such as notes callout 230 of FIG. 2 and notes callout 330 of FIG. 3.

At step 520, the VWL image is saved and associated with the corresponding ticket. For example, when an excavator completes the sketch of one or more virtual white lines and/or completes adding textual notes upon the rendered image, such as rendered image 118, the resulting marked-up image may be saved as a VWL image 116. Further, the one or more VWL images 116 may be associated with the corresponding ticket. For example, during the save operation, the excavator 412 may be prompted to enter the ticket number that was provided by the one-call center 414 at step 510.

At step 522, workforce management application 422 dispatches the ticket and the associated VWL image 116. In one example, a certain VWL image 116, such as VWL image 200 and VWL image 300, may be bundled along with its corresponding ticket information in order to create a certain ticket 426.

At step 524, one or more tickets 426 are dispatched and locate personnel 428 retrieve the one or more tickets 426 from central server 420 via their respective onsite computers 432. In one example, a certain locate personnel 428 retrieves a ticket 426 that includes a certain VWL image 116 along with its corresponding ticket information.

At step 526, locate personnel 428 view the ticket information and the VWL image 116 that indicates the line or path of planned excavation in order to perform the locate operation. In one example, a certain locate personnel 428 uses viewer 434 to view information of ticket 426 and to view a certain VWL image 116 in order to perform the locate operation along the line or path of planned excavation.

In summary, VWL application 100, VWL system 400, and/or method 500 of the present disclosure for indicating a point, line, and/or path of planned excavation may be used to reduce, preferably substantially eliminate, the amount of time spent by a locate technician reading and interpreting textual descriptions and/or interpreting verbal descriptions of the planned excavation.

Further, VWL application 100, VWL system 400, and/or method 500 of the present disclosure for indicating a point, line, and/or path of planned excavation may be used to rapidly orient the locate technician at the job site with respect to the precise location of the planned excavation. As a result, the locate operation may be performed more efficiently and more cost effectively.

Further, VWL application 100, VWL system 400, and/or method 500 of the present disclosure for indicating a point, line, and/or path of planned excavation may be used to reduce, preferably substantially eliminate, any uncertainty about the locate operation, which also has the benefit of reducing, preferably substantially eliminating, risk of damage.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for facilitating a locate operation to detect a presence or an absence of at least one underground facility within a dig area, wherein at least a portion of the dig area may be excavated or disturbed during excavation activities, the apparatus comprising:
   a communication interface;
   a display device;
   a user input device;
   a memory to store processor-executable instructions; and
   a processing unit coupled to the communication interface, the display device, the user input device, and the memory, wherein upon execution of the processor-executable instructions by the processing unit, the processing unit:
      controls the communication interface to electronically receive source data representing at least one input image of a geographic area including the dig area;
      controls the display device to display at least a portion of the at least one input image;
      acquires at least one first user input from the user input device to provide a reference for performing the locate operation;
      generates a marked-up image based-on the user input, the marked-up image including at least one reference indicator for performing the locate operation;

acquires at least one second user input from the user input device, the at least one second user input providing a description of the locate operation to be performed with reference to the at least one reference indicator for performing the locate operation;

adds the description of the locate operation to be performed to the marked-up digital image as a textual description; and further controls the communication interface and/or the memory to electronically transmit and/or electronically store information relating to the marked-up digital image together with information relating to the description of the locate operation so as to facilitate the detection of the presence or the absence of the at least one underground facility within the dig area.

2. The apparatus of claim 1, wherein the at least one reference indicator comprises a line.

3. The apparatus of claim 2, wherein the line is curved.

4. The apparatus of claim 1, wherein the at least one reference indicator comprises a plurality of connected lines.

5. The apparatus of claim 1, wherein the at least one reference indicator comprises an isolated point.

6. At least one computer-readable medium encoded with instructions that, when executed by at least one processing unit, perform a method for facilitating a locate operation to detect a presence or an absence of at least one underground facility within a dig area, wherein at least a portion of the dig area may be excavated or disturbed during excavation activities, the method comprising:

A) electronically receiving source data representing at least one input image of a geographic area including the dig area;

B) processing the source data so as to display at least a portion of the at least one input image on a display device;

C) receiving user input, via a user input device associated with the display device, the user input providing a reference for performing the locate operation;

D) adding, based on the user input, at least one reference indicator to the displayed at least one input image to provide a reference for a locate operation and thereby generate a marked-up digital image;

E) providing, via the user input device, a description of the locate operation to be performed with reference to the at least one reference indicator;

F) adding the description of the locate operation to be performed to the marked-up digital image as a textual description; and G) electronically transmitting and/or electronically storing information relating to the marked-up digital image together with information relating to the description of the locate operation so as to facilitate the detection of the presence or the absence of the at least one underground facility within the dig area.

7. The computer-readable medium of claim 6, wherein the at least one reference indicator comprises a line.

8. The computer-readable medium of claim 7, wherein the line is curved.

9. The computer-readable medium of claim 6, wherein the at least one reference indicator comprises a plurality of connected lines.

10. The computer-readable medium of claim 6, wherein the at least one reference indicator comprises an isolated point.

11. A method for facilitating a locate operation to detect a presence or an absence of at least one underground facility within a dig area, wherein at least a portion of the dig area may be excavated or disturbed during excavation activities, the method comprising:

A) electronically receiving source data representing at least one input image of a geographic area including the dig area;

B) processing the source data so as to display at least a portion of the at least one input image on a display device;

C) adding, via a user input device associated with the display device, at least one reference indicator to the displayed at least one input image to provide a reference for performing the locate operation and thereby generate a marked-up digital image;

D) providing, via the user input device, a description of the locate operation to be performed with reference to the at least one reference indicator for performing the locate operation;

E) adding the description of the locate operation to be performed to the marked-up digital image as a textual description; and F) electronically transmitting and/or electronically storing information relating to the marked-up digital image together with information relating to the description of the locate operation so as to facilitate the detection of the presence or the absence of the at least one underground facility within the dig area.

12. The method of claim 11, wherein A) through D) are performed at a location remote from the dig area.

13. The method of claim 11, wherein the information relating to the marked-up digital image and the information relating to the description of the locate operation comprise locate instruction information and the dig area corresponds to a ticket, the method further comprising:

bundling the locate instruction information with ticket information derived from the ticket.

14. The apparatus of claim 1, wherein the processing unit controls the display device so as to add the description of the locate operation to the marked-up digital image as textual information in a notes window.

15. The apparatus of claim 1, wherein the processing unit controls the display device so as to add the description of the locate operation to the marked-up digital image as textual information in a notes callout.

16. The computer-readable medium of claim 6, wherein F) comprises adding the description of the locate operation to the marked-up digital image as textual information in a notes window.

17. The computer-readable medium of claim 6, wherein F) comprises adding the description of the locate operation to the marked-up digital image as textual information in a notes callout.

18. The method of claim 11, wherein F) comprises adding the description of the locate operation to the marked-up digital image as textual information in a notes window.

19. The method of claim 11, wherein F) comprises adding the description of the locate operation to the marked-up digital image as textual information in a notes callout.

20. The apparatus of claim 1, wherein the textual description includes ticket information.

21. The computer-readable medium of claim 6, wherein the textual description includes ticket information.

22. The method of claim 11, wherein the textual description includes ticket information.

* * * * *